(12) United States Patent
Ramasubramani et al.

(10) Patent No.: US 10,404,532 B2
(45) Date of Patent: Sep. 3, 2019

(54) VIRTUAL GATEWAY CONTROL AND MANAGEMENT

(71) Applicant: Comcast Cable Communications, LLC, Philadelphia, PA (US)

(72) Inventors: Mani Ramasubramani, Sunnyvale, CA (US); Andrea Peiro, Sunnyvale, CA (US); Jeffrey Barberio, Sunnyvale, CA (US); Kris Bransom, Voorhees, NJ (US); Michael Chen, Wallingford, PA (US); Weston Schmidt, San Jose, CA (US); James Chan, San Francisco, CA (US); John Robinson, South Riding, VA (US)

(73) Assignee: Comcast Cable Commnications, LLC, Philadelphia, PA (US)

( * ) Notice: Subject to any disclaimer, the term of this patent is extended or adjusted under 35 U.S.C. 154(b) by 330 days.

(21) Appl. No.: 15/094,404

(22) Filed: Apr. 8, 2016

(65) Prior Publication Data
US 2016/0301566 A1    Oct. 13, 2016

Related U.S. Application Data

(60) Provisional application No. 62/146,008, filed on Apr. 10, 2015.

(51) Int. Cl.
*H04L 12/24* (2006.01)
(52) U.S. Cl.
CPC ........ *H04L 41/0803* (2013.01); *H04L 41/022* (2013.01); *H04L 41/0213* (2013.01);
(Continued)
(58) Field of Classification Search
CPC . H04L 41/0226; H04L 41/08; H04L 41/0803; H04L 41/0806; H04L 41/0809;
(Continued)

(56) References Cited

U.S. PATENT DOCUMENTS

| 8,085,808 B2 * | 12/2011 | Brusca | H04L 41/0226 |
| | | | 370/466 |
| 2003/0018889 A1 * | 1/2003 | Burnett | H04L 41/0809 |
| | | | 713/153 |

(Continued)

FOREIGN PATENT DOCUMENTS

| CN | 101958878 A | * | 1/2011 | ............. H04L 29/06 |
| EP | 1940079 A1 | | 7/2008 | |

OTHER PUBLICATIONS

Royon et al., "Multi-service, Multi-protocol Management for Residential Gateways", Broadband Europe, Dec. 2007 (Year: 2007).*

(Continued)

*Primary Examiner* — Vivek Srivastava
*Assistant Examiner* — William C McBeth
(74) *Attorney, Agent, or Firm* — Banner & Witcoff, Ltd.

(57) ABSTRACT

In accordance with one or more embodiments, aspects of the disclosure may provide efficient, effective, and convenient ways of managing network devices. In particular, a client router may connect to an upstream virtual gateway. The virtual gateway may manage a large number of client devices. Each client router may be represented virtually within the gateway as a virtual router. The virtual gateways may be distributed regionally, in order to manage large numbers of client routers and/or to reduce transmission delays. The virtual gateways may be managed by a gateway controller. The gateway controller may be centralized, and perform various configuration functions, such as configurations for hardware, logical networking, or content access policies. In some instances, messages sent between the gateway controller using a first protocol and the client router using a second protocol may be translated by a protocol agent.

20 Claims, 15 Drawing Sheets

(52) U.S. Cl.
CPC ........ *H04L 41/085* (2013.01); *H04L 41/0813* (2013.01); *H04L 41/0226* (2013.01); *H04L 41/0816* (2013.01); *H04L 41/12* (2013.01)

(58) Field of Classification Search
CPC ............. H04L 41/0813; H04L 41/0816; H04L 41/085; H04L 41/0853; H04L 41/0893; H04L 41/12; H04L 65/1069; H04L 41/0213; H04L 41/022

See application file for complete search history.

(56) References Cited

U.S. PATENT DOCUMENTS

| | | | | |
|---|---|---|---|---|
| 2005/0075115 | A1* | 4/2005 | Corneille | G06F 8/61 455/456.3 |
| 2007/0201508 | A1* | 8/2007 | Blackford | H04L 41/0803 370/466 |
| 2007/0283011 | A1* | 12/2007 | Rakowski | H04L 41/0803 709/225 |
| 2009/0201830 | A1* | 8/2009 | Angelot | H04L 41/0806 370/254 |
| 2010/0272057 | A1* | 10/2010 | Chen | H04L 41/08 370/329 |
| 2011/0010383 | A1* | 1/2011 | Thompson | H04L 41/085 707/769 |
| 2011/0096728 | A1* | 4/2011 | Wu | H04L 41/0803 370/328 |
| 2012/0317224 | A1* | 12/2012 | Caldwell | H04L 41/082 709/217 |
| 2013/0013752 | A1* | 1/2013 | Herrera Van Der Nood | H04L 41/0886 709/220 |
| 2013/0265910 | A1* | 10/2013 | Hillen | H04L 41/0806 370/255 |
| 2013/0268640 | A1* | 10/2013 | Wu | H04L 41/0816 709/221 |
| 2014/0115131 | A1* | 4/2014 | Zhu | H04L 41/0893 709/221 |
| 2014/0253944 | A1* | 9/2014 | Neville | H04N 1/00127 358/1.14 |
| 2014/0359170 | A1* | 12/2014 | Hutchings | G06F 13/10 710/8 |
| 2015/0074245 | A1* | 3/2015 | Ma | H04L 41/082 709/220 |
| 2015/0341216 | A1* | 11/2015 | Cooppan | H04L 41/0816 709/221 |
| 2016/0248621 | A1* | 8/2016 | Oulahal | H04L 41/0823 |
| 2018/0013606 | A1* | 1/2018 | Wang | H04L 29/06 |

OTHER PUBLICATIONS

Machine translation of Ping, Pub. No. CN101958878 A, published Jan. 26, 2011 (Year: 2011).*

European Extended Search report—App No. 16164653.4—dated Sep. 2, 2016.

Broadband Forum: "1lTR-069 CPE WAN 1-15 Management Protocol"—Jul. 1, 2011—URL:http://www.broadband-forum.orgjtechnicaljdownload/TR-069 Amendment-4.pdf.

* cited by examiner

VIRTUAL GATEWAY CONTROL AND MANAGEMENT

CROSS-REFERENCE TO RELATED APPLICATIONS

This application claims the benefit of U.S. Provisional Application No. 62/146,008 filed Apr. 10, 2015, entitled "VIRTUAL GATEWAY CONTROL AND MANAGEMENT." The contents of the above noted application are hereby incorporated by reference in their entirety.

BACKGROUND

Various kinds of computing devices, from personal computers to mobile devices, are becoming increasingly popular. In addition, more of these devices are being connected to local area networks. This may cause users to encounter situations where network management has become difficult. As these devices continue to grow in popularity and users continue to use them for an ever-growing number of reasons, the users of these devices have demanded and will continue to demand better ways of managing network devices, securing those devices, and connecting new devices and technologies.

SUMMARY

One or more aspects may provide for more convenient, functional, and easy-to-use ways for managing network devices. In particular, one or more aspects of the disclosure relate to computing hardware and computer software for managing network devices in a distributed environment.

In accordance with one or more embodiments, aspects of the disclosure may provide efficient, effective, and convenient ways of managing network devices. In particular, a client router may connect to an upstream virtual gateway. The virtual gateway may manage a large number of client devices. Each client device may be represented virtually within the gateway as a virtual router. The virtual gateways may be distributed regionally, in order to manage large numbers of client devices and/or to reduce transmission delays.

A gateway controller at a host facility may contain hardware and/or software modules for managing the virtual gateways and/or other networking aspects. For example, the gateway controller may manage router configuration in hardware and/or software, determine the status of connected devices, and/or implement domain name service ("DNS") policies for connected devices.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

According to some aspects described herein, a system may allow for the control and management of wireless devices at scale. By centralizing router control and management, a service provider may provide more advanced services for a wider variety of downstream devices with less management by the client. This may be accomplished by virtualizing client devices such as modems and/or routers owned or leased to a client. In some instances, the client devices may be client routers.

Rather than performing higher layer routing functions at the client routers, the client devices may forward higher layer traffic along to a virtual gateway, such as the virtual routers of a Virtual Routing Gateway. This may be done via an overlay network. The Virtual Routing Gateway may then communicate with a Virtual Gateway Controller described in FIGS. 3-7. The Virtual Gateway Controller may perform networking tasks, or may send configuration information to the Virtual Routing Gateway. In this manner, networking functions for the client devices may be performed by virtual routers and/or gateways upstream from the client routers.

Figure 1:
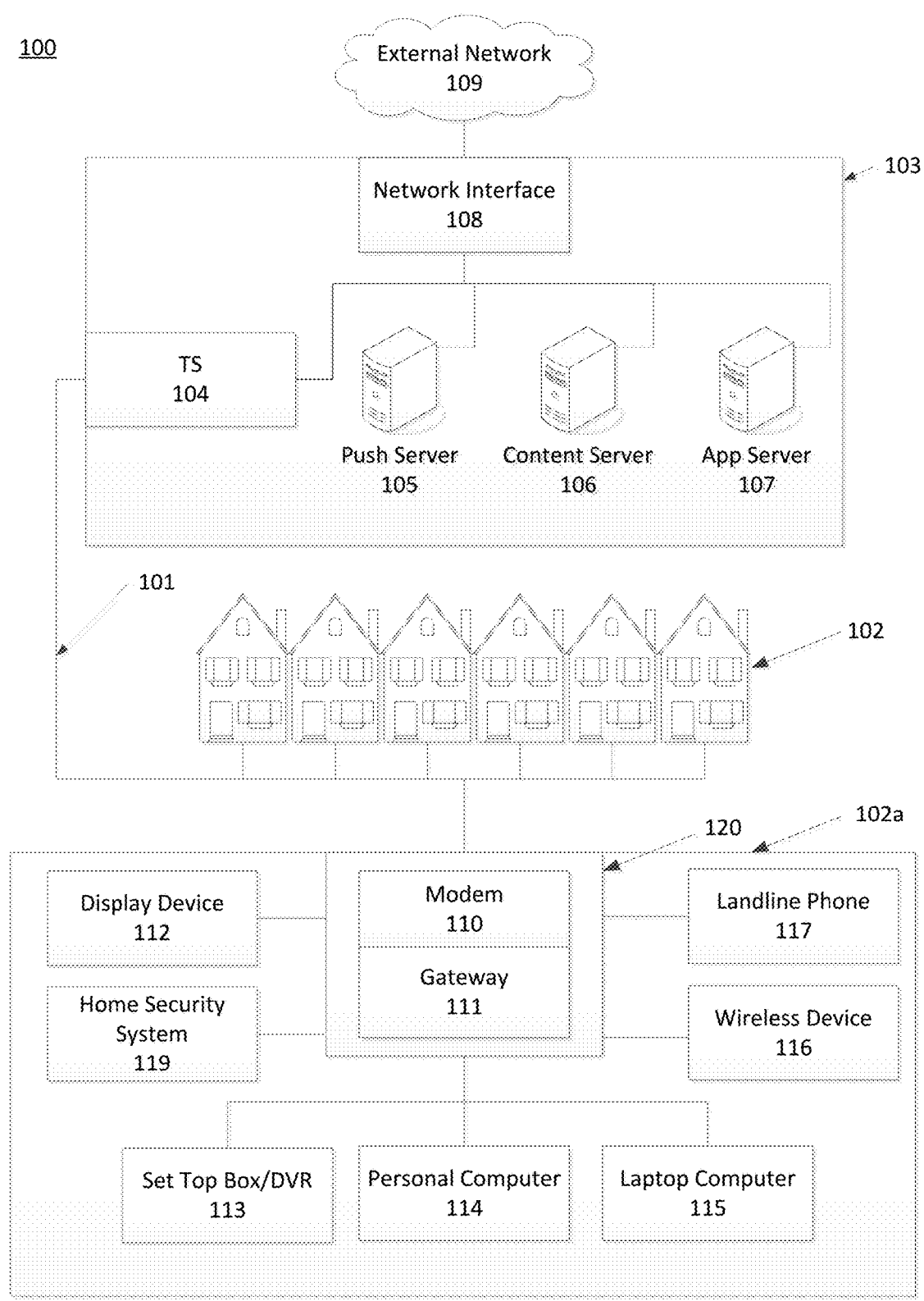
FIG. 1 depicts an example network environment in which one or more aspects of the disclosure may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102a, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
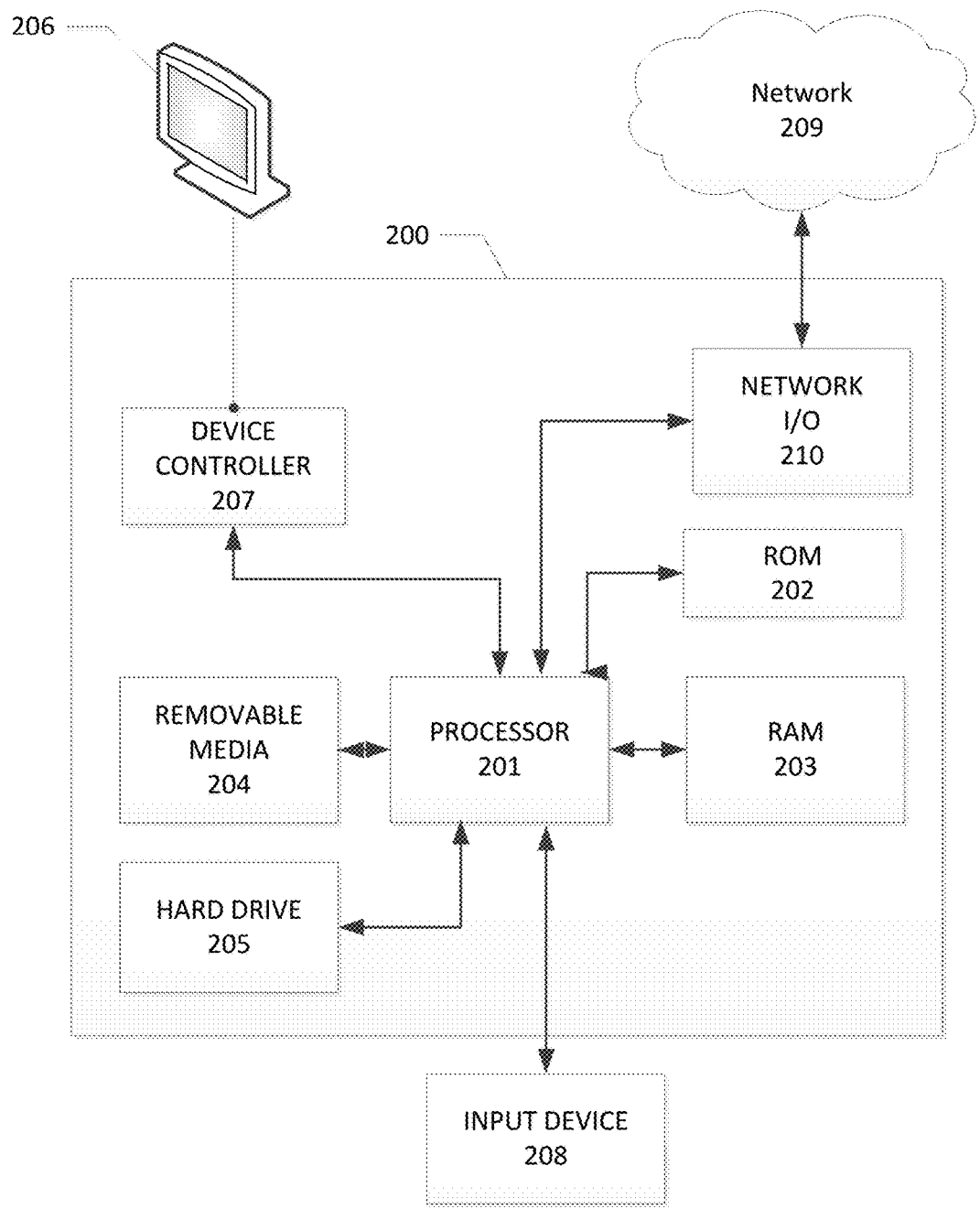
FIG. 2 depicts an example software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

Figure 3:
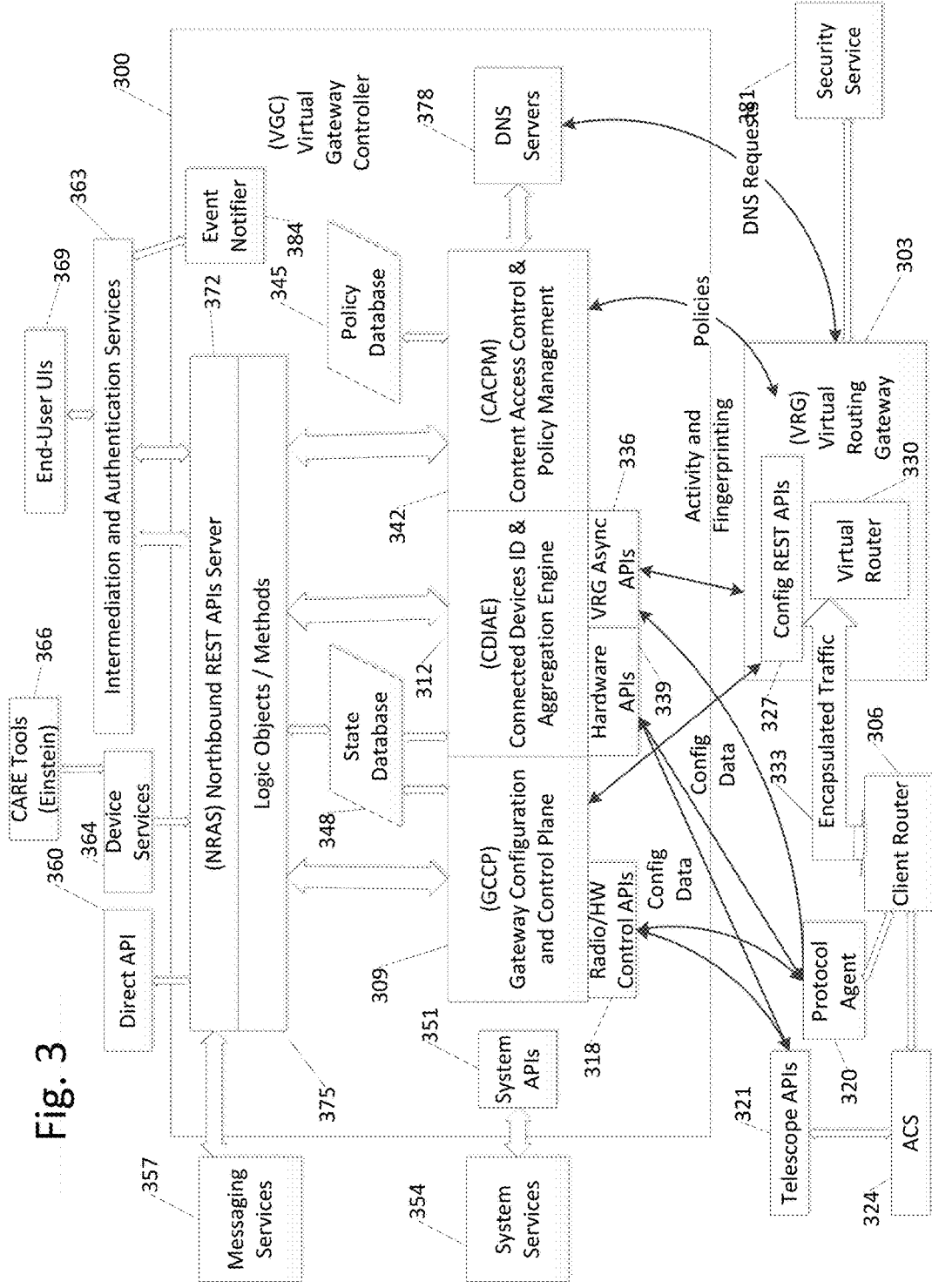
FIG. 3 depicts an example of a virtual gateway control and management system.

FIG. 3 depicts an illustrative example of a virtual gateway control and management system. A Virtual Gateway Controller (VGC) 300 may manage numerous client routers 306 through one or more Virtual Routing Gateways (VRG) 303. The VGC and/or the VRG may be implemented as a computing device 200. In some instances, the VGC 300 may operate on a central server. For example, the VGC 300 may operate at a national distribution center for a service provider. In other instances, the VGC 300 may operate in a distributed server architecture. For example, some components may be housed at a national distribution center, while other components may be housed in a regional distribution center. Client routers 306 may be routing or gateway devices in the home. In some instances, the client routers 306 may be implemented as interfaces 120. The client routers 306 may implement multiple functions, such as wireless networking, Ethernet networking, and/or telephone service that may be configured and/or managed according to the systems and methods described herein. In some instances, client routers may be comprise, be connected to, and/or control one or more other downstream devices, such as consumer premises equipment (CPE).

The VGC 300 may be comprised of a number of components. In some instances, the VGC may contain a Gateway Configuration and Control Plane (GCCP) 309. The GCCP 309 may provide instructions for configuration and management of hardware connections, which may be stored in a state database 348, to one or more client routers 306. The state database may store information for one or more devices associated with the VGC 300 and/or client router 306. The information may comprise a configuration identifier, MAC address, and/or other settings for each device. To delete a device from the database, the system may remove the associations between the information and/or with the VGC 300 and or client router 306. In some instances, communication pathways, such as Ethernet ports on the client router 306, may be associated with individual identifiers and/or vLANs. The GCCP may communicate configuration information to Telescope application programming interfaces (APIs) 321 using Radio/Hardware APIs 318. The Telescope APIs 321 may communicate to an Access Control System (ACS) 324. The ACS 324 may then send the configuration and management information to the client routers 306. In some instances, this configuration may be done using DOCSIS. Further, a hardware configuration over DOCSIS may be performed prior to performing logical configuration in order to authenticate client devices with a service provider's network. Further discussion of router hardware configuration and management may be found in FIG. 4.

The GCCP 309 may also provide instructions for configuration and management of logical connections to one or more VRGs 303 and/or one or more client routers 306. The GCCP may provide configuration data stored in a state database 348 to a VRG 303 through a Configuration REST API 327. The VRG may then manage one or more virtual routers 330 based on the configuration data. The virtual routers 330 may be logical representations of actual client routers 306, and may transfer layer 2 (L2) and layer 3 (L3) traffic from the client routers 306 in to the virtual router 330. For example, wireless routers in a neighborhood may each be mapped to a virtual router 330. All L2/L3 traffic may pass directly on to the virtual router 330. In some instances, the routing information may be encapsulated as encapsulated traffic 333. For example, the encapsulated traffic 333 may be encapsulated with Generic Router Encapsulation (GRE). The encapsulated traffic may comprise a container that may identify and/or aggregate messages. This may have the advantage of alleviating issues that may occur during buffering. For example, multiple data packets may be encapsulated as a single MessageEnvelope message. If a first packet and second packet are separated by a third packet, the system may be able to identify that the first packet and the third packet comprise the same MessageEnvelope message. Using GRE encapsulation may have the benefit of providing a robust network, because tunnels may be opened and closed dynamically (in some embodiments they may not establish continuous connections, which may be prone to interruption).

In some instances, virtual routers 330 may be assigned to VRGs 303 according to a load balancing algorithm. For example, initially, each virtual router 330 in a small town may be assigned to a single VRG 303. If the town grows, a new VRG 303 may be created for the area, and the virtual routers 330 may be distributed across the two VRGs 303. This may have the advantage of using logical assignments to balance network loads without needing to make new physical assignments or connections.

In some instances, the virtual routers 330 may perform one or more routing functions on the traffic, and may be managed and/or operated by the VRG 303. For example, the virtual routers may perform one or more layered routing functions, such as network address translation (NAT), dynamic host configuration protocol (DHCP), HTTP requests, or other such functions. In some instances, the virtual routers 330 may operate within the VRG 303. This may be done in hardware and/or in software. The VRG 303 may run on a server. For example, VRG servers may be established in local regions. This may have the advantage of centralizing the gateways for easier management, while keeping the gateways close to the client routers 306 to reduce access times as traffic passes through the VRG. Also, this may have the advantage of allowing for advanced routing functions to be performed (by the VRG) without using advanced software or hardware on the actual client routers 306. Further discussion of router logical management and configuration may be found in FIG. 5.

In some instances, a security service 381 may interface with the VRG 303. The security service 381 may include a number of different client protection services, including malware protection, identity protection, antivirus protection, or traffic monitoring services.

In some instances, the VGC 300 may contain a Connected Devices Identification and Aggregation Engine (CDIAE) 312. The CDIAE 312 may read information and connection status for all client routers 306 connected to VRGs 303. Using the VRG Asynchronous APIs 336, the CDIAE 312 may receive and store L2/L3 information passed on by the VRGs 303. The Hardware APIs 339 may receive and store information related to physical connections, such as wireless signal strength or an Ethernet interface, by communicating to the Telescope APIs 321. Further discussion of reading the status of network devices may be found in FIG. 6.

In some instances, the VGC 300 may contain a Content Access Control and Policy Management module (CACPM) 342. The CACPM 342 may apply access control policies to the client routers 306 by interfacing with the VRGs 303. The CACPM 342 may obtain or store policies in a policy database 345. The policies may be used to create domain name service (DNS) profiles in the DNS servers 378. The DNS requests from the one or more VRGs 303 may correspond to one or more DNS policies for retrieval handled by the DNS servers 378. Further discussion of DNS policy handling may be found in FIG. 7.

In some instances, the VGC 300 may contain other interfaces for communicating with other outside components. An administrator may manage the configuration of the VGC 300 using system services 354 talking to System APIs 351. The VGC 300 may be accessed by messaging services 357, direct access APIs 360, device services 364, or intermediation and authentication services 363. Device services 364 may connect to CARE Tools (Einstein) 366. In some instances, the intermediation and authentication services 363 may be a platform, such as a server, which bridges a VGC 300 with client access devices. The intermediation and authentication services 363 may connect to a variety of devices, such as end-user interfaces (UIs) 369. End-user UIs 369 may be implemented in different ways, such as dedicated applications or web interfaces. For example, a user may be presented with a graphical user interface displaying router settings and/or allowing a user to configure router settings. These external modes of access may interface with a Northbound REST APIs Server (NRAS) 372 of the VGC. The NRAS 372 may control various logical objects and/or methods 375, which may then communicate with or control various modules of the VGC 300, such as those described in FIGS. 5-7. Thus, the NRAS 372 may accept provide bi-directional feedback with the external modes of access in order to exchange information and/or commands with the various logical objects and/or methods 375.

The VGC 300 may also push messages to the consumer. For example, the VGC 300 may supply notifications to the consumer originating from an event notifier 384. The event notifier 384 may take multiple granular and/or highly technical system events and correlate them via application layer logic into a notification. The notifications may then be provided to consumers through intermediation and authentication services 363 to other devices. For example, the event notifier 384 may push notifications to set-top boxes, streaming devices, smart devices (such as internet-enabled lighting, thermostats, etc.), marketing devices (such as electronic signage), or any other such devices.

Figure 4:
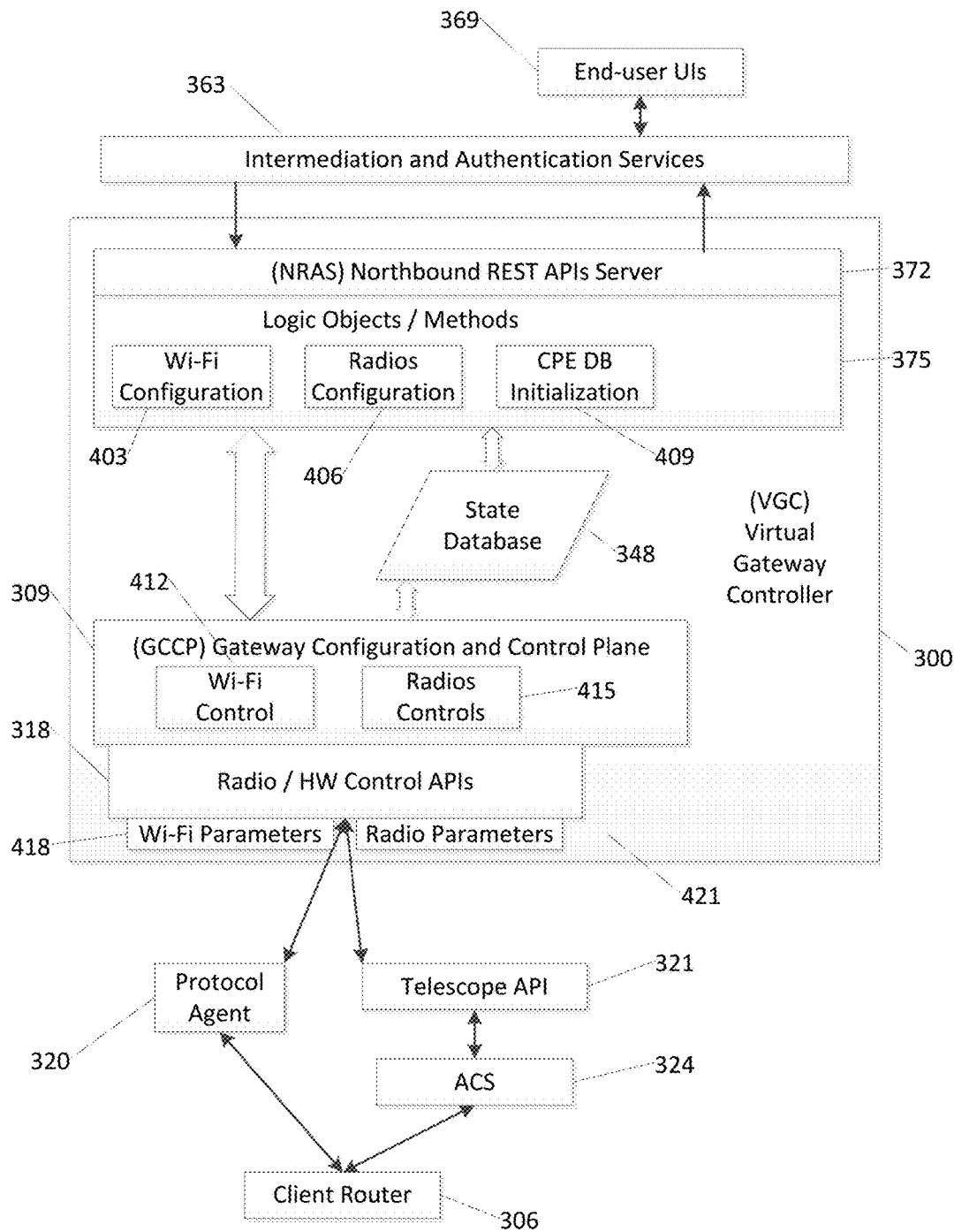
FIG. 4 depicts an example of a system for router hardware configuration and management.

FIG. 4 depicts an illustrative example of a system for hardware configuration and management. In some instances, the system may be implemented as part of a larger system, such as that depicted in FIG. 3. A VGC 300 may contain modules configured to manage the configuration of hardware features of one or more client routers 306. Because hardware features may exist on a level below that of logical features, it may be advantageous to utilize a system such as that depicted in FIG. 4 for hardware configuration (rather than sending configuration data over logical connections) in order to more effectively configure physical settings of a device. An end-user user interface (UI) 369 may be an end-user application that allows for a user to manage configurations. For example, the end-user UIs 369 may present an application on a computer or a cell phone. The end-user UIs may pass commands and/or information back and forth with intermediation and authentication services 363. For example, device configuration parameters entered on end-user UIs 369 may be passed on to the intermediation and authentication services 363. The intermediation and authentication services 363 may then direct the configuration data to the appropriate VGC 300 by interfacing with the NRAS 372.

The NRAS 372 may interface with one or more logic objects and/or methods 375. Those logic objects and/or methods may include configuration modules for various aspects of hardware configuration. In some instances, the logic objects and/or methods may include a wi-fi configuration module 403. The wi-fi configuration module 403 may manage the wireless configuration of client routers 306. For example, the wi-fi configuration module 403 may provide methods for setting up service set identifications (SSIDs), setting up wireless security, and/or various other wireless protocol settings. In some instances, the logic objects and/or methods may include a radio configuration module 406. The radio configuration module 406 may manage wireless channels, wireless transmit power, and/or various other radio transmission settings. In some instances, the logic objects and/or methods may include a module for CPE database (DB) initialization 409. The CPE DB initialization module 409 may manage the initialization of consumer-premises databases. The logic objects and/or methods may store or retrieve information in a state database 348. The logic objects and/or methods may also communicate with a GCCP 309.

In some instances, a CPE may be a set-top box that may provide content and/or interactive services to a user. The CPE may have various associated settings, such as favorite channels, guide settings, user settings, recording settings, networking settings, audio/visual settings (such as resolution or input assignments), voice over IP (VoIP) settings, long-term evolution (LTE) wireless settings, and/or any other setting that may be associated with a CPE. The systems and/or methods described herein may provide additional functionality for the downstream devices.

In some instances, a CPE may be a wireless range extender associated with a client router 306. The wireless range extender may have settings for one or more antennas. These settings may be stored on the VGC 300 in order to facilitate effective communication between the client router 306 and other devices and/or CPEs associated with the client router 306.

The CPE database may store information regarding the CPEs. The stored information may allow for the storage, changing, and reconfiguration of CPE settings. In some instances, the VGC 300 may update, restore, and/or reconfigure settings on a CPE using one of the systems and/or methods described herein regarding client router 306. For example, a configuration change sent to client router 306 may comprise a change to parental controls on a set-top box. When the client router 306 receives the changes, it may implement the changes itself using built-in functionality and/or pass the changes on to the set-top box so that the set-top box may implement changes. In some instances, the set-top box may communicate back to the VGC 300 (such as through error or status messages) via the client router 306 using the systems and/or methods described herein regarding the client router 306.

In some instances, CPEs data stored in the VGC 300 may be used to save and/or restore CPE settings in the event of device failure, replacement, upgrade, relocation and/or any other such instance. This may have the advantage of allowing the user to maintain settings despite replacing a physical device. For example, a service provider may replace a set-top box assigned to a user with a newer model. The user may have stored a number of recordings on the set-top box. Recording settings associated with the CPE may comprise actual recordings and/or pointers to recordings. After the set-top box is replaced, the VGC 300 may restore the settings stored in the CPE database consistent with one or more methods described herein. The restored settings may comprise pointers to the old recordings stored in a server. This may allow users to maintain their recordings despite the hardware change.

The GCCP 309 may set or retrieve hardware settings on one or more client routers 306. The GCCP 309 may include a wi-fi controls 412 and/or radio controls 415. In some instances, these controls may be hardware and/or software configured to manage wi-fi or radio settings on one or more client routers 306. The GCCP may invoke commands through radio/hardware control APIs 318. These commands may instruct a Telescope API 321 to set wi-fi parameters 418 and/or radio parameters 421. Parameters may be received from end-user UIs 369, a state database 348, or may be a part of the radio/hardware control APIs 318. The Telescope API 321 may forward communication changes to the ACS 324. The ACS 324 may acknowledge the command, and/or send appropriate commands to the client routers 306 to change settings. In some instances, the commands may be in the form of Technical Report 069 (TR069) commands. In some instances, the client routers 306 may store a record of what configurations are performed and/or how the configurations are performed. If the ACS acknowledges an error-free configuration, the GCCP may store the configuration change in the state database 348. Configuration changes may also be communicated back to end-user UIs 369, which may be displayed to a user.

In some instances, alternatively or in addition to the Telescope API 321, a protocol agent 320 may assist with transmitting one or more messages between the VGC 300 and the client router 306. The protocol agent 320 may be an intermediary server which may exist between the VGC 300 and the client router 306. In some instances, accompanying software and/or a portion of the protocol agent 320 may also exist on the VGC 300 and/or client router 306. For example, the protocol agent 320 may comprise software on an intermediary server and a subroutine running on the client router 320.

In some instances, the protocol agent 320 may facilitate communication and/or network awareness for the client router 306. The protocol agent 320 may assist the client router 306 in opening a connection with the VGC 300 and maintaining that connection. A given VGC 300 in one location may be associated with a large number of connected client routers 306 in a variety of locations. Client routers 306 may have difficulty finding network addresses and/or encounter impediments to communication (such as firewalls on client routers 306). By allowing the client router 306 to initiate communication with the VGC 300 (which may have a known network address and/or may be configured to facilitate client router 306 transmissions), connections may be established faster and/or more easily.

The protocol agent 320 may facilitate the client router 306 establishing communication by storing the network addresses for the client routers 306 and their associated VGCs 300. When the client router 306 attempts to send a message, it may transmit a message that may indicate that the message is intended for some VGC 300, though it may not indicate a particular VGC 300 or address. The message may pass through a protocol agent 320, which may determine the correct VGC 300 for the message, perform any necessary translation (such as described below), and transmit the message on to the correct VGC 300. A message from the VGC 300 to the client router 306 may identify the client router 306 using an identifier other than a network address. The protocol 320 may receive the message from the VGC 300, determine the network address of the client router 306 based on the identifier, and transmit the message to the client router 306.

In some instances, a protocol agent 320 may be used to translate commands from a form used by the VGC 300 to a form used by the client router 306. It may be advantageous for the VGC 300 to utilize a consistent terminology for commands and/or objects used by the VGC for internal storage and/or communication with the VRG 303 and/or client router 306. For example, the VGC 300 may use a canonical data object model, such as Technical Report 181 (TR181), for at least a subset of commands and/or objects used by the VGC 300. In some instances, the protocol agent 320 may send and/or receive messages using asynchronous communication. However, other devices may not be compatible with the terminology used by the VGC 300. For example, a client router 306 may require commands in TR069, Simple Network Management Protocol (SNMP), Secure Shell (SSH), or another such protocol. This may have the advantage of allowing the VGC 300 to use the consistent terminology while still sending messages in a form as required by the client router 306.

The protocol agent 320 may receive messages from the VGC 300 via the Radio/HW Control APIs 318, the Hardware APIs 339, and/or the VRG Async APIs 336. These messages may comprise objects and/or commands using a common terminology for the VGC 300 platform. For example, the objects and/or commands may be formatted in accordance with TR181 and a defined set of APIs for the VGC 300. This may have the advantage of simplifying the infrastructure of the VGC 300 and reducing potential errors by implementing a common language for internal communication within the VGC 300 and for communications with services connected to the NRAS 372.

The protocol agent 320 may process the received messages and translate them into a form acceptable to the client router 306. For example, the protocol agent 320 may receive a message from the VGC 300 via the VRG Async APIs 336 formatted according to TR181. The protocol agent 320 may then convert the TR181 message using an appropriate data object model and/or protocol (such as TR069, SNMP, SSH, or another such data object model and/or protocol) that is compatible with the client router 306. This translated message may then be passed on to the client router 306. This may have the advantage of allowing the VGC 300 to execute commands using a common format regardless of the requirements of the client router 306. This may allow the VGC 300 to operate with a wide variety of different types of client router 306, as the protocol agent 320 may provide flexibility regarding supported client router 306 protocols and transmission methods.

Similarly, the protocol agent 320 may also support sending messages from the client router 306 to the VGC 300. As described above, the protocol agent 320 may translate messages from a format supported by the client router 306 to a common format used by the VGC 300. This may allow for the client router 306 to communicate with the VGC 300 even if the client router 306 has difficulty (through a lack of software, firmware, a hardware limitation, etc.) communicating in the communication standard utilized by the VGC 300. This may have the advantage of allowing a service provider to update the protocol agent 320 to support bi-directional communication from the VGC 300 to client routers 306 using additional protocols and/or support communication to additional devices without requiring the service provider to specially customize software and/or hardware on the client routers 306 for communication with the VGC 300.

The protocol agent 320 may facilitate bi-directional and/or asynchronous communication between the VGC 300 and the client router 306. The client router 306 may initiate communication by sending a message as described above. The VGC 300 may then authenticate the client router 306 in response to the message. After authentication, a continuous and/or open virtual connection may exist between the client router 306 and the VGC 300 through the protocol agent 320. This connection may utilize sockets, TR181, TR069, remote SSH, SNMP, any other such protocol and/or data object model, and/or any combination of any such protocol and/or data object model (such as by utilizing the translation functions of a protocol agent 320 as described above). Once the connection is established, the VGC 300 and/or client router 306 may send message to each other through the authenticated virtual connection, which may occur asynchronously and/or concurrently. This may have the advantage of reducing the impact of transmissions by reducing the number of re-authentications required for messages.

The protocol agent 320 may facilitate the transmission of messages over the bi-directional framework. For example, the protocol agent 320 may receive a TR181 message from a web socket connection to the VGC 300. The protocol agent 320 may then perform a translation of the message to translate the message to a format compatible with SNMP, and transmit the message to the client router 306. The protocol agent 320 may also act as a communication buffer for transmissions between the VGC 300 and the client router 306. For example, the VGC 300 may send a message via a bi-directional web socket connection to the protocol agent 320. However, the protocol agent 320 may be connected via a uni-directional connection to the client router 306, which the client router 306 may be using to send a message to the VGC 300. The protocol agent 320 may buffer the message from the VGC 300 while it receives the message from the client router 306, and then transmit the message from the VGC 300 to the client router 306 when the uni-directional connection becomes available. This may have the advantage of functionally allowing bi-directional and/or asynchronous communication when one or more connections are uni-directional.

Figure 5:
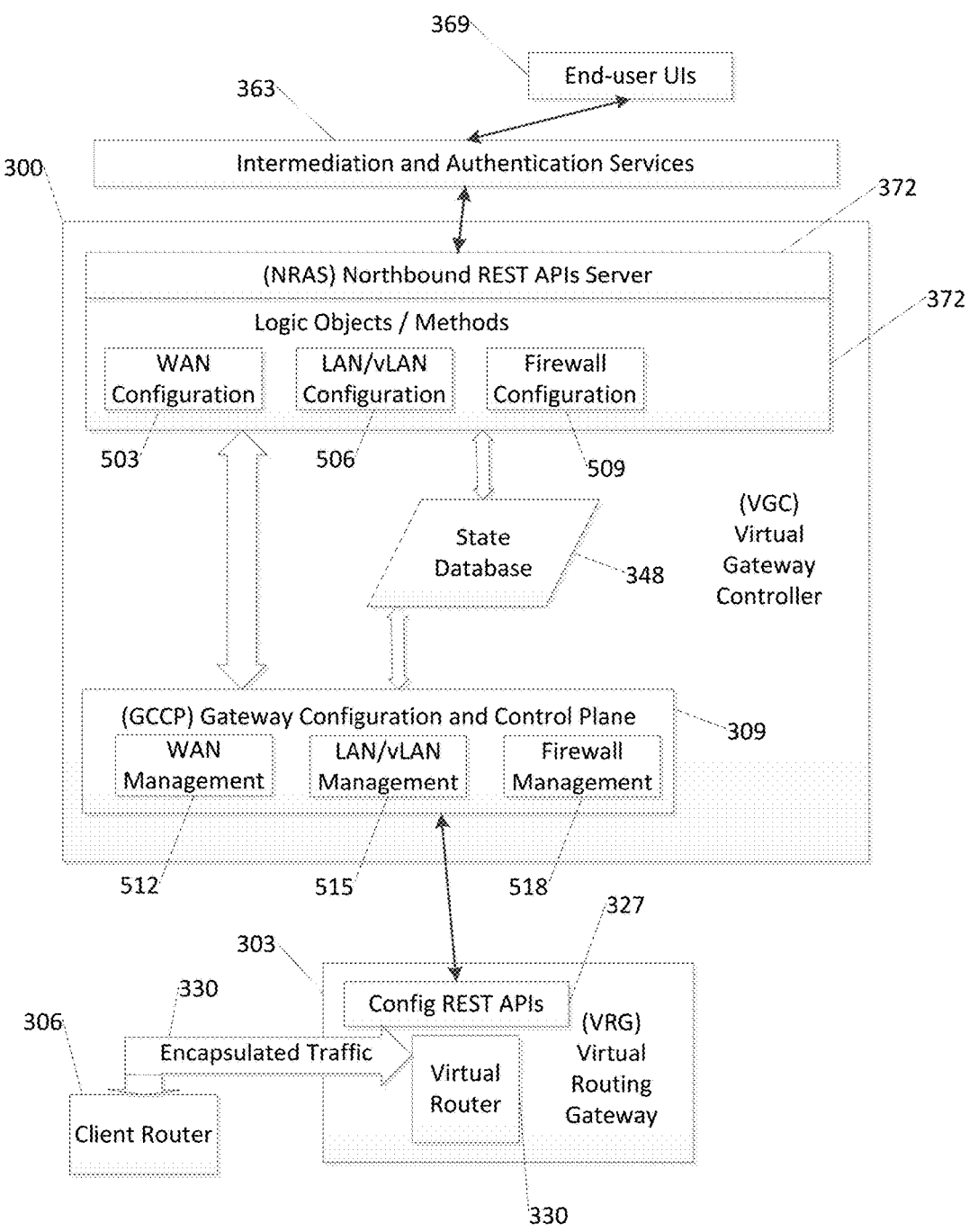
FIG. 5 depicts an example of a system for router logical configuration and management.

FIG. 5 depicts an illustrative example of a system for router logical configuration and management. In some instances, the system may be implemented as part of a larger system, such as that depicted in FIG. 3. A VGC 300 may include modules configure to manage the logical configuration of one or more client routers 306. A user and/or device associated with and/or connected to the VGC 300 may set configuration settings. For example, End-user UIs 369 may allow a user to configure logical router configuration. The end-user UIs 369 may communicate with intermediation and authentication services 363. The intermediation and authentication services may pass information and/or configuration parameters to the NRAS 372 of the VGC 300. For example, upon receiving a configuration request at the end-user UI, configuration parameters may include Internet Protocol parameters, firewall parameters, DHCP parameters, NAT parameters, and/or other such networking parameters.

The VGC 300 may invoke logic objects and/or methods in response to a requested configuration. In some instances, a wide-area network (WAN) configuration module 503, a local area network (LAN) configuration and virtual local area network (vLAN) module 506, and/or a firewall configuration module 509. These modules may control one or more other modules for router configuration. In some instances, the logic objects and/or methods may communicate with the GCCP 309. The GCCP 309 may include code for managing router logic. In some instances, the GCCP 309 may include a WAN management module 512 which may manage WAN settings on a virtual router 330. In some instances, the GCCP 309 may include a LAN/vLAN management module 515 which may manage LAN/vLAN settings on a virtual router 330. In some instances, the GCCP 309 may include a Firewall management module 518 which may manage firewall settings on a virtual router 330.

The GCCP 309 of the VGC 300 may communicate with the Configuration REST APIs 327 of a VRG 303. The VRG 303 may perform the various logical routing functions, such as WAN, LAN/vLAN, and firewall functions, by configuring the virtual routers 330. In some instances, the VRG may store a record of what configurations are performed and/or how the configurations are performed. Upon error-free configuration, the configuration change may be stored in a state database 348. Further, the end-user UI may display any configuration changes executed to the client routers 306 or the virtual router 330.

In some instances, the GCCP 309 may react to information from the CDIAE 312. For example, the CDIAE 312 may identify that the configuration state is wrong, such as a client device having an outdated version. In another example, the CDIAE may identify a device failure. In these instances, the GCCP 309 may perform a configuration to fix the problem, such as updating software, fixing an error, and/or bringing a new virtual device online. Further discussion of determining the status of network devices follows in FIG. 6.

Figure 6:
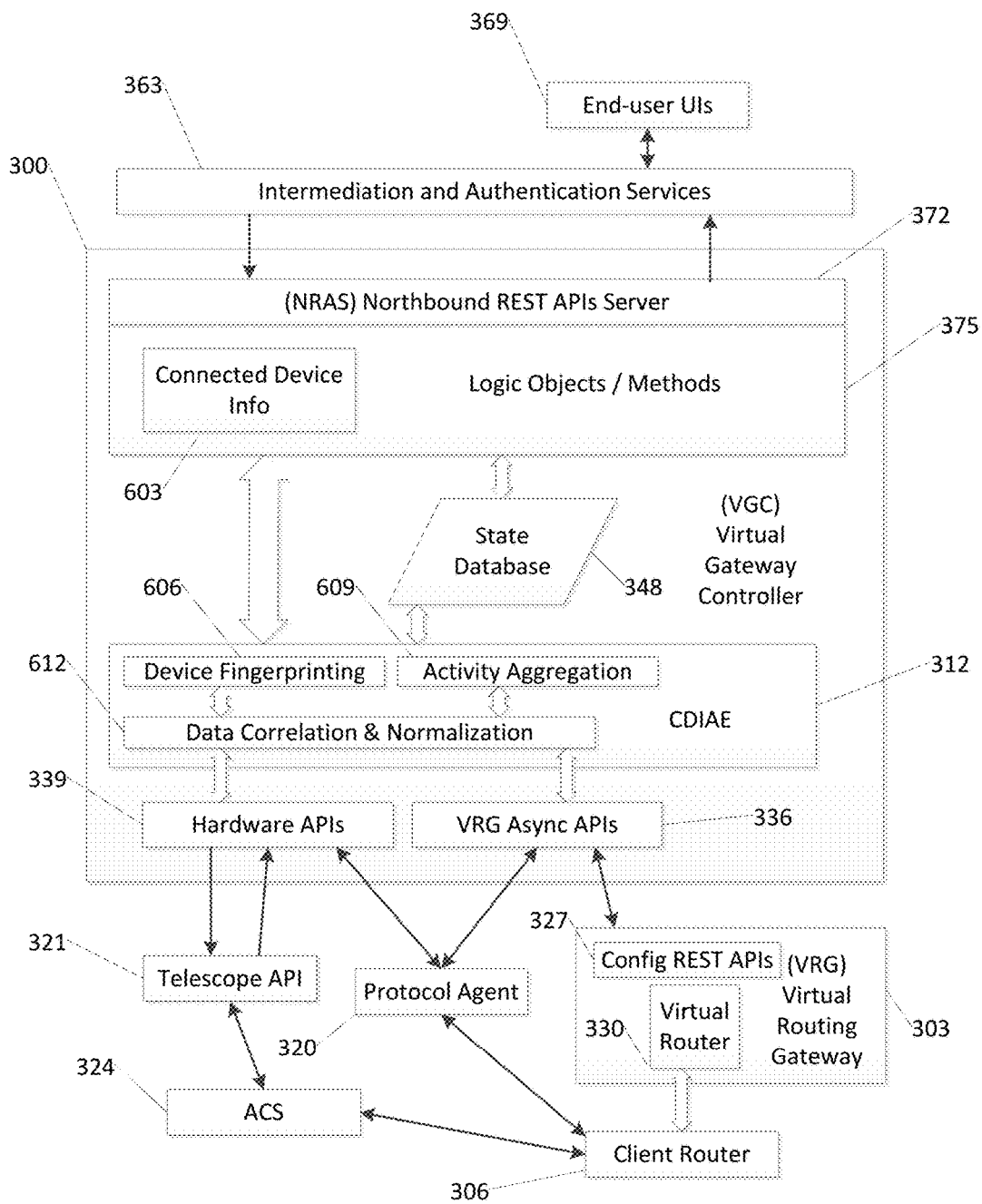
FIG. 6 depicts an example of a system for reading the status of network devices.

FIG. 6 depicts an illustrative example of a system for determining the status of network devices. In some instances, the system may be implemented as part of a larger system, such as that depicted in FIG. 3. One or more client routers 306 may produce information relating to their physical connections, such as layer 1 (L1) information and information relating to its logical connections, such as L2 and L3 information. For example, the client routers 306 may transmit packets with a MAC address corresponding to the client routers 306 or devices connected to the client routers 306. The system may read such information to determine device characteristics. The information may be produced at the request of a device, such as a VGC 300, client router 306, or VRG 303. The information may also be produced at predefined intervals. In some instances, the information may be communicated asynchronously.

In response to a request from the ACS 324 initiated by the CDIAE 312, the client routers 306 may produce information about their physical connections to the ACS 324. In some instances, the information may be sent via TR069 messages. This information may be passed from the ACS 324 to the Telescope API 321, and on to Hardware APIs 339 of the CDIAE 312.

In some instances, information may also be passed through a protocol agent 320. The protocol agent 320 may receive status information from the client router 306 according to a first format supported by the client router 306 (such as TR069, SNMP, SSH, or another such format). The protocol agent 320 may then translate the status updates into a format supported by the VGC 300 (such as TR181). The protocol agent 320 may then pass the information using TR181 to the VGC 300.

In response to a request from the VRG Async APIs 336 of the CDIAE 312, the VRG 303 may asynchronously send information about the state of the virtual routers. For example, the VRG 303 may send a list of connected devices, network traffic, routing tables, and/or other L2/L3 information. In another example, the VRG 303 may send a configuration ID. This may include a vector clock and/or a version identifier for the configuration of the VRG 303. In some instances, the VRG 303 may store a configuration ID for devices connected downstream. In some instances, DHCP data and usage accounting data may be transmitted from the VRG 303 to the VRG Async APIs 336. In some instances, the VRG Async API 336 may be based on Apache Kafka, and/or may use protocol buffers.

The CDIAE 312 may contain multiple modules for processing the network status information. For example, the CDIAE 312 may include a data correlation and normalization module 612. The data correlation and normalization module may analyze the data received through the Hardware APIs 339 and/or the VRG Async APIs 336. An activity aggregation module 609 may aggregate information relating to device or router activity.

A device fingerprinting module 606 may analyze the data to determine devices or routers connected to the network. The fingerprinting module 1099 may use information about devices to identify those devices over time. The device fingerprinting module 606 may identify simple information, such as a MAC address, or it may identify more advanced information, such as the type of device/and or its location. The device fingerprinting module 606 may utilize information including the data path, user interactions, and/or external device mapping databases to create a historical comparison model. The device fingerprinting module 606 may then identify intrinsic characteristics of connected devices and/or their operating systems. In some instances, the fingerprinting module 606 may determine if a device is static, such as a printer or set top box, or mobile, such as a smartphone or tablet. The accuracy of the device fingerprinting module 606 may increase over time as more information is gathered. Further, a user may interact with the fingerprinting module 606. For example, an end-user UI 369 may identify devices connected to a virtual router 330. A user may then be able to set information about connected devices in the end-user UI 369. This may assist the device fingerprinting module 606 in obtaining more accurate information.

The CDIAE 312 may communicate with a state database 348, an other storage device, and/or logic objects and/or methods 375. The CDIAE 312 may store network information in the state database 348, where it may be passed on to the logic methods 375. In some instances, information is stored in the state database 348 via a waterfall data model. This may be stored with progressive levels of time-series aggregation.

The information obtained by the CDIAE 312 may be communicated to the logic objects and/or methods 375. In some instances, a connected device information module 603 may organize the information obtained by the CDIAE 312. In some instances, the information may be aggregated via a waterfall time series. This may include organizing information related to devices historically connected to a VRG 303 or the client router 306s. An end-user UI 369 may present the information to an end user, which may be proactively or upon request.

In some instances, the information obtained may be compared against a state database 348 to determine if the information indicates a problem. For example, the state database 348 may store history and version information for a list of devices. The CDIAE 312 may identify that obtained information indicates an outdated version, an error state, or a missing device. If a problem is detected, the CDIAE 312 may trigger a configuration to correct the problem, such as by triggering the GCCP 309 as discussed in FIG. 5.

Figure 7:
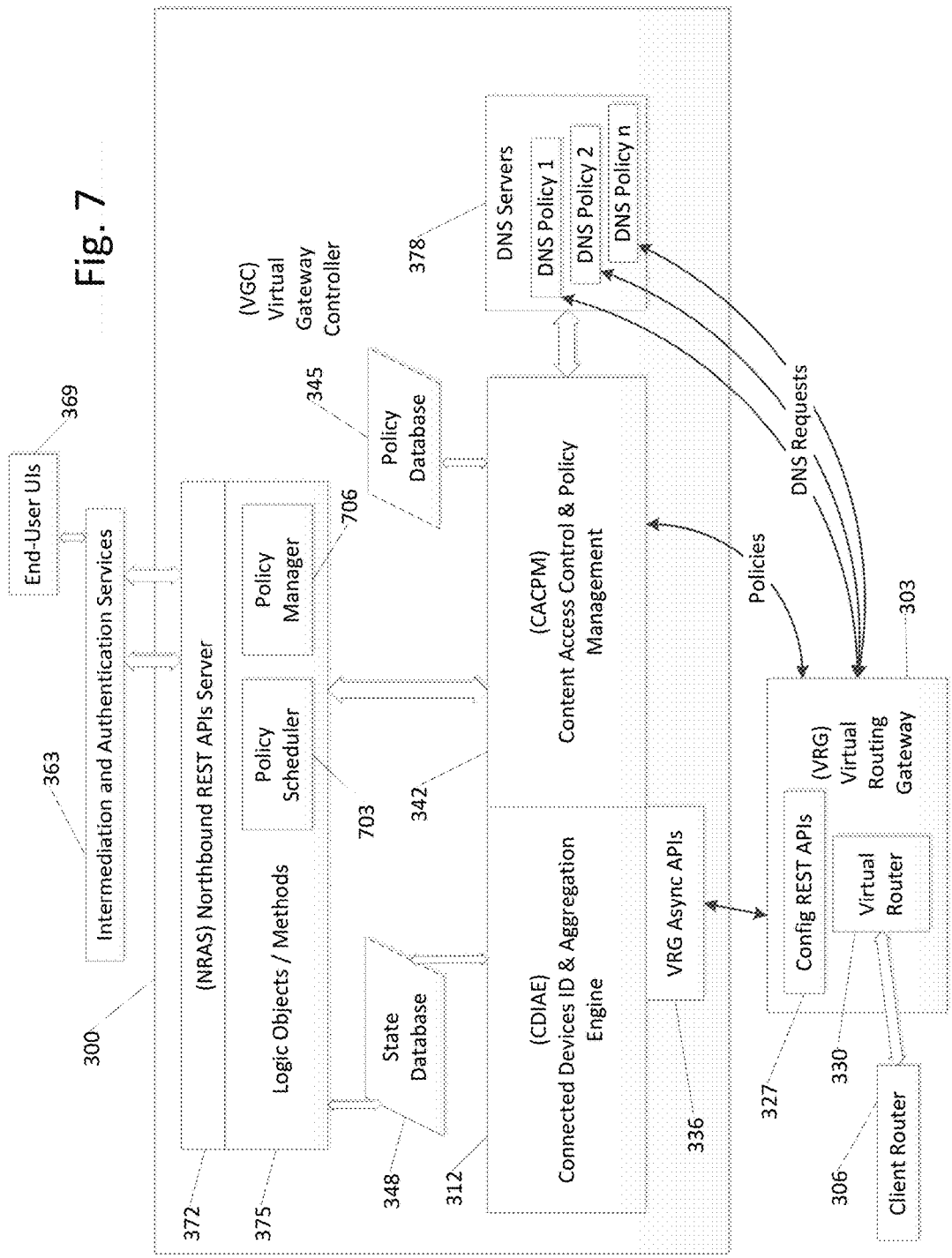
FIG. 7 depicts an example of a system for DNS policy handling.

FIG. 7 depicts an illustrative example of a system for DNS policy handling. In some instances, the system may be implemented as part of a larger system, such as that depicted in FIG. 3. A VGC 300 may apply content access control policies across connected devices in a virtual gateway model. The system may manage multiple DNS policies in a cloud DNS server 378. The system may also intelligently manage connections. For instance, the system may optimize radio frequency (RF) utilization by off-loading to wireless networks.

A user may log into an end-user UI 369 to access a policy management screen. Policy management screens may allow the user to view or alter configuration information. The configuration information may be sent through intermediation and authentication services 363 to the NRAS 372 of a VGC 300. The NRAS 372 may access logic objects and/or methods 375. For instance, the logical objects and/or methods 375 may include a policy scheduler 703 and/or a policy manager 706. The policy scheduler 703 may allow for changes in the scheduling of a policy. The policy manager 706 may retrieve or store information from the policy scheduler 703, a state database 348 (which may pull from a CDIAE using methods described herein), or from the CACPM 342. If a change to the configuration may be desired, the policy manager may initiate a change by sending a command to the CACPM 342.

The CACPM 342 may manage DNS policies for virtual routers 330 of a VRG 303. Each virtual router 330 may have an assigned DNS policy. For example, a virtual router 330 corresponding to one of the client routers 306 in a home with small children may not resolve addresses to pornographic websites. The VRG 303 may identify packets from that virtual router 330 and apply the appropriate DNS policy. Specific devices or users may have assigned DNS policies. For example, a DNS policy for a child's cell phone may restrict the cell phone from accessing pornographic websites while not prohibiting access to other devices on a network. This may be done by identifying the device, or by identifying the user of the device.

In order to execute multiple DNS policies, the VGC may implement one or more DNS servers 378. The DNS servers may contain multiple DNS policies, with each policy following different rules. The CACPM may dynamically assign policies to individual devices. For example, policies may be specified on a per-MAC basis for a packet data protocol DNS forwarder. When the VRG 303 identifies that a given virtual router 330 may be making a DNS request, the VRG 303 may then send the request to the DNS policy specified for the given virtual router 330. The CACPM may manage the DNS policies by transmitting and receiving configuration information from the policy manager 706, and configuring the DNS Server 378 accordingly. Configuration information may be stored in a policy database 345. Because the DNS policies may be implemented in a cloud environment within the VGC 300, this may have the advantage of allowing for advanced DNS options tailored for a given user, while still maintaining centralized management.

As an example usage scenario, a user may start by pulling up a configuration screen on an end-user UI 369. The configuration screen may allow the user to set up multiple profiles for different users and/or devices. The configuration screen may also present parental control options. For example, the screen may allow the user to select different parental control levels, which may include blocking certain websites, restricting certain types of traffic (such as video), restricting access to certain times of day, and/or other such settings. The user may be able to select from a set of predefined policies and/or create a custom policy. For example, the user may select a general policy for children that excludes a list of known adult sites. In another example, the user may create a custom policy based on the policy for children that that allows select sites that were part of the list of known adult sites. These policies may be implemented in hardware and/or software in a VGC 300 according to the system above. When a client device downstream attempts to access content, the requested access may be processed by the VRG 303. The VRG 303 may then communicate with the VGC 300 to obtain proper policies for the user and/or device making the request. The policies may be stored in a policy database 345 indexed against identifiers matching client devices and/or users. In some instances, the policies may be indexed according to MAC identifiers. This may allow a policy to be associated with a device across a variety of locations and/or networks. For example, a policy associated with a cell phone for a child may be applied on the home network, over an LTE network, and on a network at the home of a friend. The VGC 300 may send policy information to the VRG 303, such as information identifying the policy or rules for enforcement of the policy. In some instances, the VRG 303 may enforce an access policy on the traffic, such as restricting the traffic, by itself. In other instances, the VRG 303 may send a DNS request with information identifying the client devices and/or users or the policy to be enforced to DNS servers 378.

In some instances, the DNS servers 378 enforce a policy based on information contained in a DNS request (in some instances, the information may indicate the policy to use, or may supply an identifier that the DNS server uses to ascertain the correct policy). For example, a child may attempt to access a pornographic website on his bedroom computer. A DNS request from his computer may be sent to DNS servers 378, which may enforce a restricted content DNS policy. For example, this may resolve the DNS address to an internal page saying "access denied" rather than being directed to the external, restricted content. In another example, a child seeking to access the internet after 9:00 PM may have all attempts at access redirected to an "access denied" page rather than the requested page. In yet another example, a service provider may provide a whitelist for allowed content. Any attempt to access content outside the whitelist may instead resolve to a page requesting a user-name and password, which may only redirect to the requested content if the correct credentials are entered. Thus, the DNS servers may effectively restrict access to content by controlling whether DNS requests resolve to the requested content or to another page.

Figure 8:
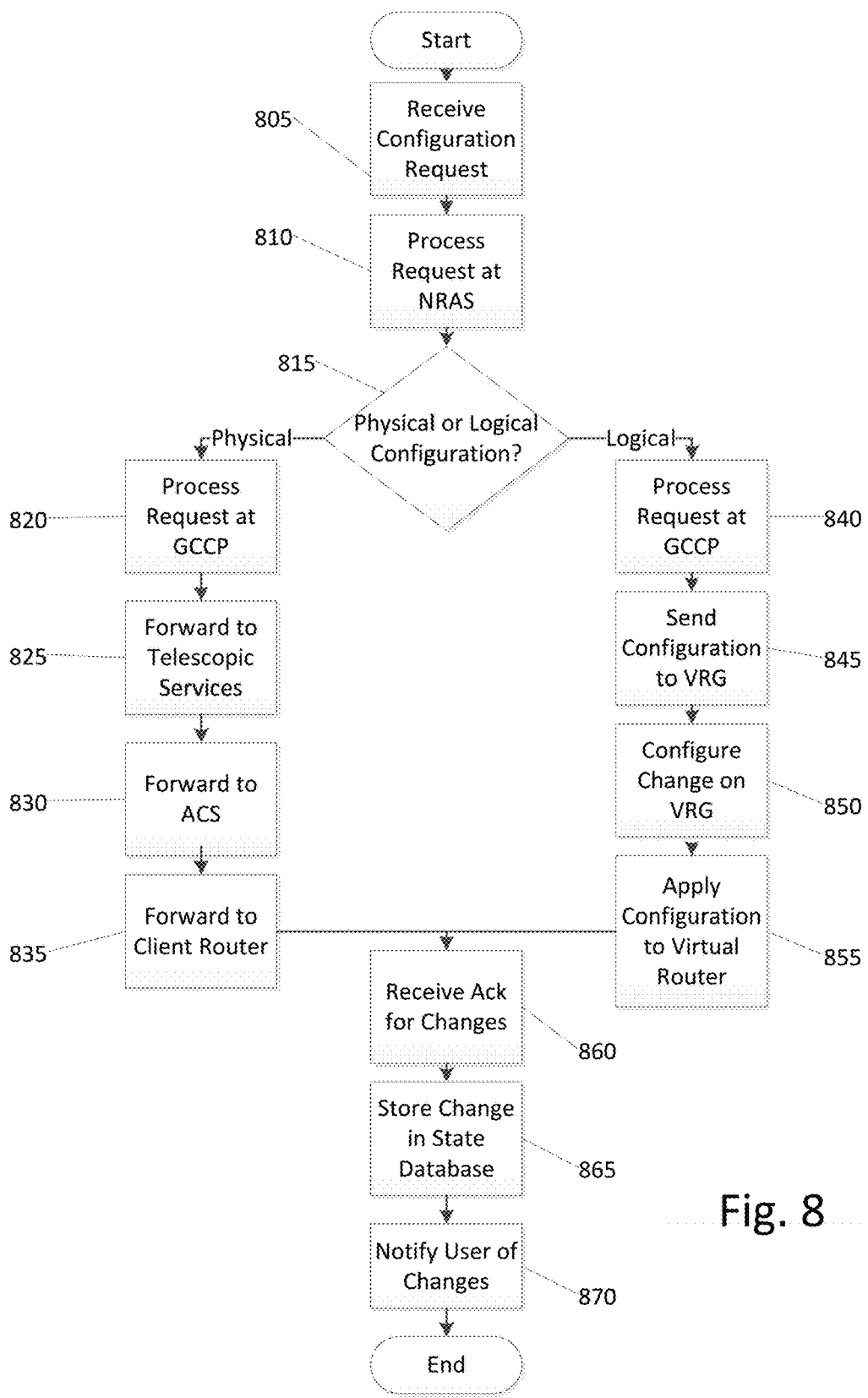
FIG. 8 depicts an example method for router configuration.

FIG. 8 depicts an illustrative method for router configuration. At step 805, the VGC 300 may receive a configuration request. For example, a user may access an interface screen on the end-user UI 369. The user may select configuration options on the screen. This may trigger a configuration request to be transferred to the VGC 300 according to one of the systems described in FIGS. 4-7.

At step 810, the configuration request may be processed at the NRAS 372. The NRAS 372 may include one or more modules for handling different requests as described in FIGS. 4-7. These modules may determine what configuration to perform for the request, and/or obtain information from a state database 348.

At step 815, the VGC 300 may determine whether to perform a physical or logical configuration. A physical configuration may relate to configuration at the physical layer, such as radio configuration or Ethernet configuration. To perform a physical configuration, the VGC 300 may proceed to step 820. A logical configuration may relate to configuration at a logical layer, such as layers 2 and/or 3. To perform a logical configuration, the VGC 300 may proceed to step 840.

At step 820, the GCCP 309 may process the hardware configuration request. At step 825, the GCCP 309 may invoke Radio/Hardware APIs 318 to connect with Telescopic Services through the Telescope APIs 321. At step 830, the Telescope APIs may forward configuration changes to the ACS 324. At step 835, the ACS may send instructions for configuration changes to the client routers 306. In some instances, this may be done via TR069 commands. The VGC 300 may then await receipt of an acknowledgement for the requested changes at step 860.

At step 840, the GCCP 309 may process the hardware configuration request. At step 845, the GCCP 309 may send a configuration request to a VRG 303 using the Configuration REST APIs 327. At step 850, the VRG 303 may make the requested configuration changes. At step 855, those configuration changes may be applied to a virtual router 330 corresponding to one of the client routers 306. The VGC 300 may then await receipt of an acknowledgement for the requested changes at step 860.

At step 860, the VGC 300 may receive an acknowledgment that the requested changes have been made. At step 865, the VGC 300 may then store the changes in a state database 348. At step 870, the VGC 300 may notify the user of the configuration changes. For example, an end-user UI 369 may be updated to display the new configuration settings.

Figure 9:
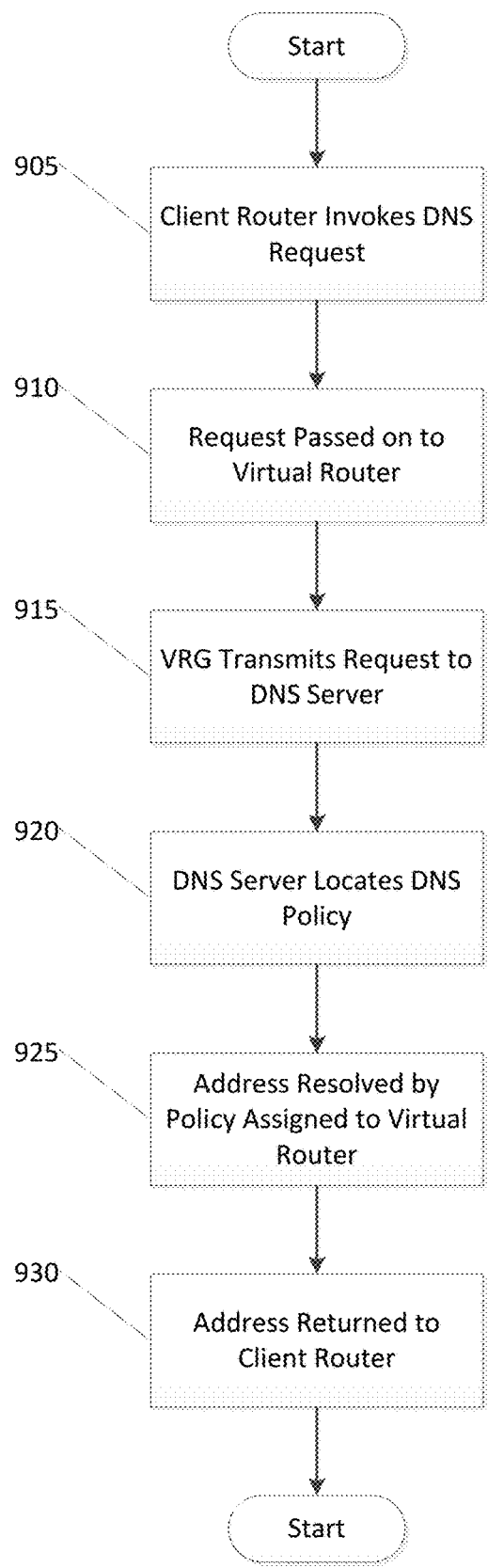
FIG. 9 depicts an example method for DNS policy handling.

FIG. 9 depicts an illustrative method for DNS policy handling. Using a system such as that described in FIG. 7, a user may configure one or more DNS policies for traffic coming from one of the client routers 306. Using the method described herein, the DNS policies may be applied to the traffic.

At step 905, the client routers 306 may invoke a DNS request. For example, a device connected to the client routers 306 may request to access an HTTP site using a named web address. The connected device may need to resolve the web address to a numeric IP address using a DNS server. At step 910, the request to resolve the DNS request may be passed on to the virtual router 330. The encapsulated traffic 333 may include information identifying a device making the request. For example, a child's phone may be identified so that a DNS policy specific to the phone may be applied. The encapsulated traffic 333 may arrive at the virtual router 330, which may be part of a VRG 303.

At step 915, the VRG 303 may transmit the DNS request to a DNS server 378. The VRG 303 may associate one or more devices downstream from the VRG 303 with one or more policies based on an association provided by the CACPM 342. Based on the policy association, the VRG 303 may sign the DNS request with a signature that identifies the device, an associated vLAN, the VRG 303, and/or an associated policy. For example, the VRG 303 may transmit the DNS request along with information comprising a signature identifying the requesting device to a DNS server 378 that may be part of a VGC 300. At step 920, the DNS server 378 may locate the DNS policy corresponding to the request. Policies may be created on a vLAN, MAC address, and/or router level. Thus, a policy may apply to a segment of devices on a virtual router 330 making the DNS request, all requests from a virtual router 300, and/or, in some instances, a particular device downstream from the virtual router 330. For example, the DNS server 378 may communicate the identity of a requesting device to the CACPM 342, which may retrieve the policy for the requesting device from the policy database 345, and send an indication of the appropriate DNS policy to apply to the DNS servers 378. At step 925, the address may be resolved by the DNS server 378 according to the policy assigned to the requesting device. At step 930, the address may be returned to the client routers 306.

Figure 10:
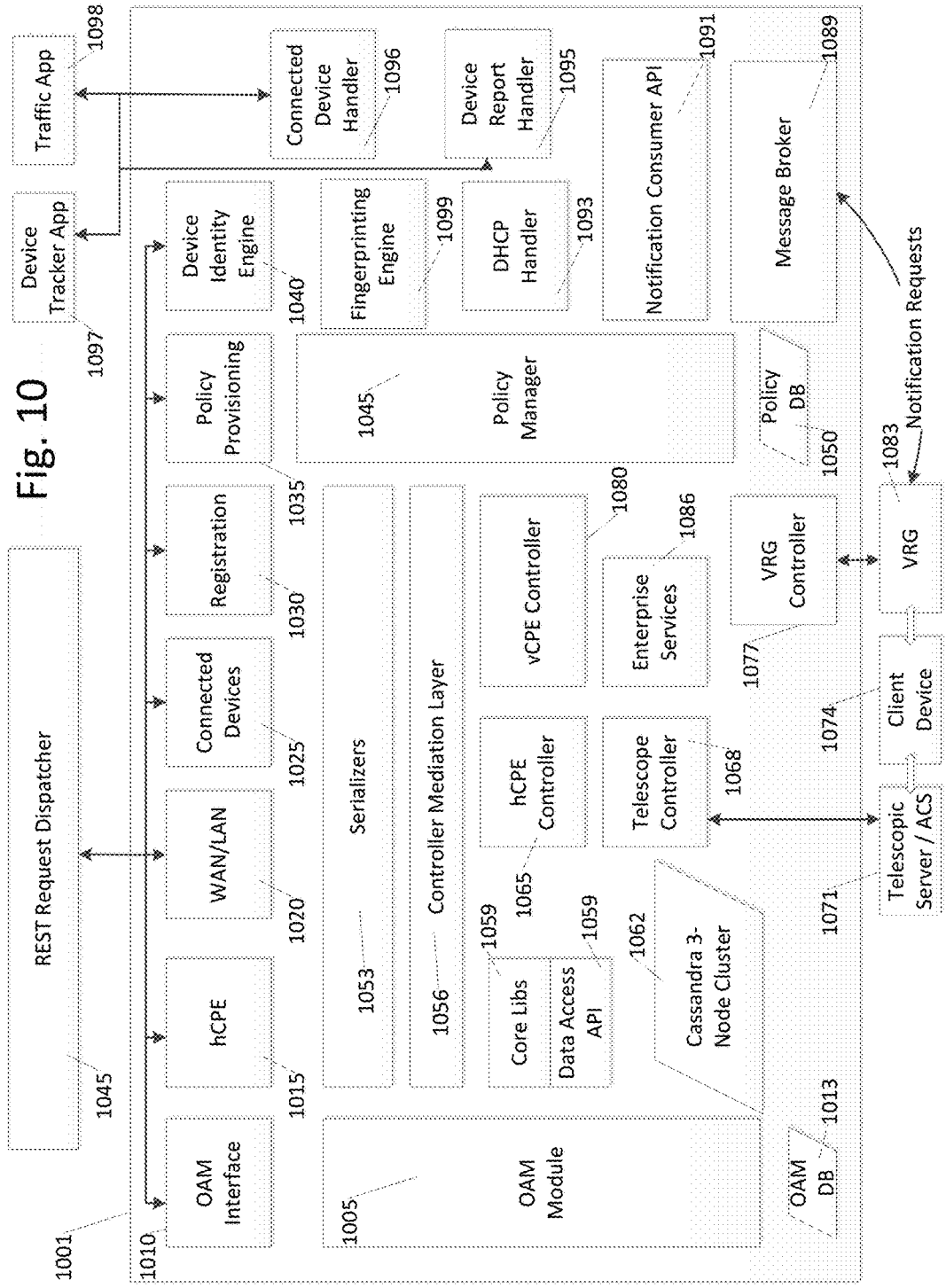
FIG. 10 depicts an example of a virtual gateway control and management system component architecture.

FIG. 10 depicts an illustrative example of a virtual gateway control and management system component architecture. The architecture may be an implementation for a system such as that depicted in FIG. 3. In some instances, A VGC architecture 1001 may comprise an implementation of a VGC 300. The VGC architecture 1001 may include a number of different modules, and/or interfaces.

The architecture may include an operations, administration, and management (OAM) module 1005. The OAM module 1005 may manage the operational aspects of the system, such as Ethernet interfaces, system power, credentials, and other system functions. The OAM module 1005 may receive instructions from an OAM interface 1005. The OAM interface 1005 may provide a number of APIs or other methods for external access. For example, the OAM interface 1005 may communicate with a REST request dispatcher 1045. The REST request dispatcher 1045 may be an external service that allows for interaction with the architecture 1001. For example, the REST request dispatcher may interface with various service provider management software to allow service provider employees or technicians to interact with the architecture 1001.

The architecture 1001 may include a number of different modules for allowing a user to interact with the architecture 1001 in order to manage aspects of a network. One module may be a home CPE (hCPE) module 1015, which may manage interactions with various devices in a client's home, such as routers, set top boxes, phones, or other such devices. A WAN/LAN module 1020 may manage networking aspects to consumer equipment. For example, it may manage provisioning information, assigned network addresses, bandwidth allocations, and/or other network settings. A connected devices module 1025 may manage connected devices, such as cell phones or laptops, that may have access to the network or network management functions. A registration module 1030 may allow for devices or services to be registered with the architecture 1001. A policy provisioning module 1035 may allow policies to be set. A device identity engine 1040 may track and/or catalogue the identity of devices accessing the system. As an example of how a module may operate, a user on a laptop may configure settings which are sent through the REST request dispatcher 1045 to the policy provisioning module 1035. The policy provisioning module 1035 may then communicate with a policy manager 1045. The policy manager 1045 may perform policy management functions, such as tracking user profiles and/or DNS settings. The policy manager 1045 may store information in a policy database 1050.

A serializer 1053 may manage information within the system. The serializer 1053 may process information so that it may be effectively communicated to/from external sources while still being maintained within the system. For example, the serializer may convert information between Python classes, Java classes, XML files, plain text, and/or other formats so that it may be understood by different components or services within or external to the architecture 1001. This information may be sent through a controller mediation layer 1056. The controller mediation layer may manage the flow of information between different modules. For example, the controller mediation layer may perform authentication, encryption, and/or logging functions on information as it passes between modules so that the modules themselves don't have to. The mediation layer may also direct information to where it may be needed, and/or ensure that information may be in the correct formats to be handled.

There may be one or more common libraries and/or data access functions in the architecture 1001. A core libraries module 1059 may provide core software libraries that may be shared among modules. For example, proprietary software libraries may be managed by the core libraries module 1059 to supply common functions to various modules in the architecture 1001. A data access API 1059 may allow for data access within the architecture 1001. The data access API 1059 may manage data access so that the system has a common method of retrieving stored information within the architecture 1001. For example, the data access API 1059 may provide mutex protection for information when information reads and/or writes are requested by different modules.

The architecture 1001 may include a storage database 1062. This may provide for a common storage location for the architecture 1001 for modules to use. The location may be centralized, or it may be distributed. For example, the storage database 1062 may be implemented as a Cassandra node cluster.

The architecture 1001 may include modules for controlling downstream devices and/or services. For example, an hCPE controller 1065 may manage various devices in a client's home, such as routers, set top boxes, phones, and/or other such devices. The controller may send trigger commands to be sent through other modules, such as a telescope controller 1068. The telescope controller 1068 may interact with a telescopic server and/or ACS 1071. This may manage a client device 1074. In some instances, devices may be virtualized. Virtualized devices may be managed by a virtualized CPE (vCPE) module 1080. For example, the vCPE 1080 may trigger instructions in a VRG controller 1077. The VRG controller 1077 may manage one or more VRGs 1083 downstream from the architecture 1001. Further discussion of client router and VRG management may be found in FIGS. 3-9. An enterprise services module 1086 may manage further services or devices. For example, the enterprise services module 1086 may manage a wireless application gateway.

The architecture 1001 may also include a messaging system. A message broker 1089 may manage information to and from the system. For example, a message broker 1089 may handle notification requests to/from a VRG 1083. In some instances, the message broker 1089 may be implemented as an Apache Kafka cluster. Notifications may also be accessed by a consumer through a notification consumer API 1091. For example, the notification consumer API 1091 may provide a notification to a consumer's cell phone whenever a new device connects wirelessly to their router.

The architecture 1001 may include various modules for monitoring and/or tracking client devices. A DHCP handler 1093 may manage IP addresses assigned to and/or within the architecture 1001, and/or those assigned by the architecture 1001 to downstream devices. Using those IP addresses, a device report handler 1095 may track the client devices and the traffic that passes through the client devices. A connected device handler 1096 may match the client devices to the IP addresses. Using this information, the architecture 1001 may identify client devices to a device tracker app 1097, and/or traffic information to a traffic app 1098. The architecture 1001 may also perform tracking and identification functions using a fingerprinting module 1099. The fingerprinting module 1099 may use information about devices to identify those devices over time. The fingerprinting module 1099 may identify simple information, such as a MAC address, and/or it may identify more advanced information, such as the type of device/and or its location.

Figure 11:
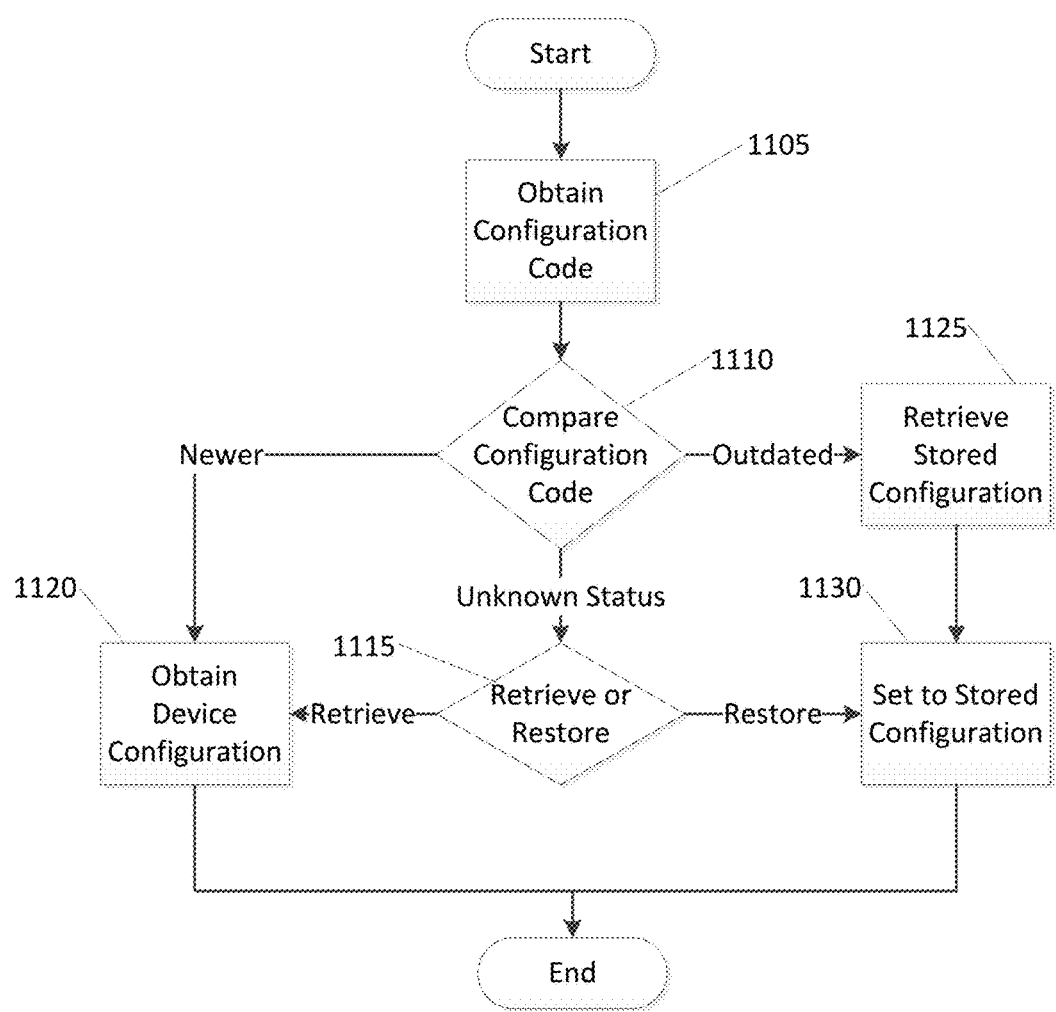
FIG. 11 depicts an example method for checking and setting device configurations.

FIG. 11 depicts an illustrative method for checking and setting device configurations. A client device may be configured with a configuration code. The configuration code may indicate the method by which the device is configured, and/or the most recent configuration. For example, the configuration code may indicate that a device was configured by a VGC 300 on Feb. 4, 2011. In another example, the configuration code may indicate that a device was configured by simple network management protocol (SNMP) on Apr. 3, 2001.

At step 1105, a computing device, such as a VGC 300, may obtain a configuration code. For example, a configuration code may be obtained using a system such as described in FIG. 6. In some instances, the code may be sent proactively by a client device. In other instances, the code may be requested. At step 110, the computing device may compare the configuration code against one stored in the system. For example, a VGC 300 may check the received configuration code against a code stored in a state database 348. If the configuration code indicates that a newer configuration exists than was last stored by the computing device, the computing device may proceed to step 1120. If the configuration code indicates that the status is unknown, the computing device may proceed to step 1115. For example, the configuration code may have indicated that the last settings were performed via SNMP. The computing device may not trust the configuration set by SNMP, and may flag any configuration done using SNMP as being "unknown." If the configuration code indicates that a newer configuration is available, the computing device may proceed to step 1125.

At step 1115, the computing device may determine whether to retrieve or restore a configuration. For example, if a recent configuration is available, the computing device may choose to restore the client device to the recent configuration at step 1130. In another example, it may be that the most recent configuration on file is old, so the computing device may choose to retrieve the configuration on the device at step 1120.

At step 1120, the computing device may choose to obtain the device configuration. For example, a VGC 300 may obtain device configuration information according to the system in FIG. 6. The computing device may then store the new configuration. For example, the VGC 300 may store the configuration in a state database 348. After retrieving the configuration, the method may terminate.

At step 1125, the computing device may retrieve a stored configuration. For example, the VGC 300 may obtain a configuration stored in a state database 348. After retrieving the stored configuration, the computing device may then proceed to setting the stored configuration on the client device in step 1130.

At step 1130, the computing device may configure the client device with the stored configuration. For example, the VGC 300 may configure a client device with a configuration stored in a state database 348 according to the systems of FIG. 4 or FIG. 5. After configuring the client device, the method may terminate.

Figure 12:
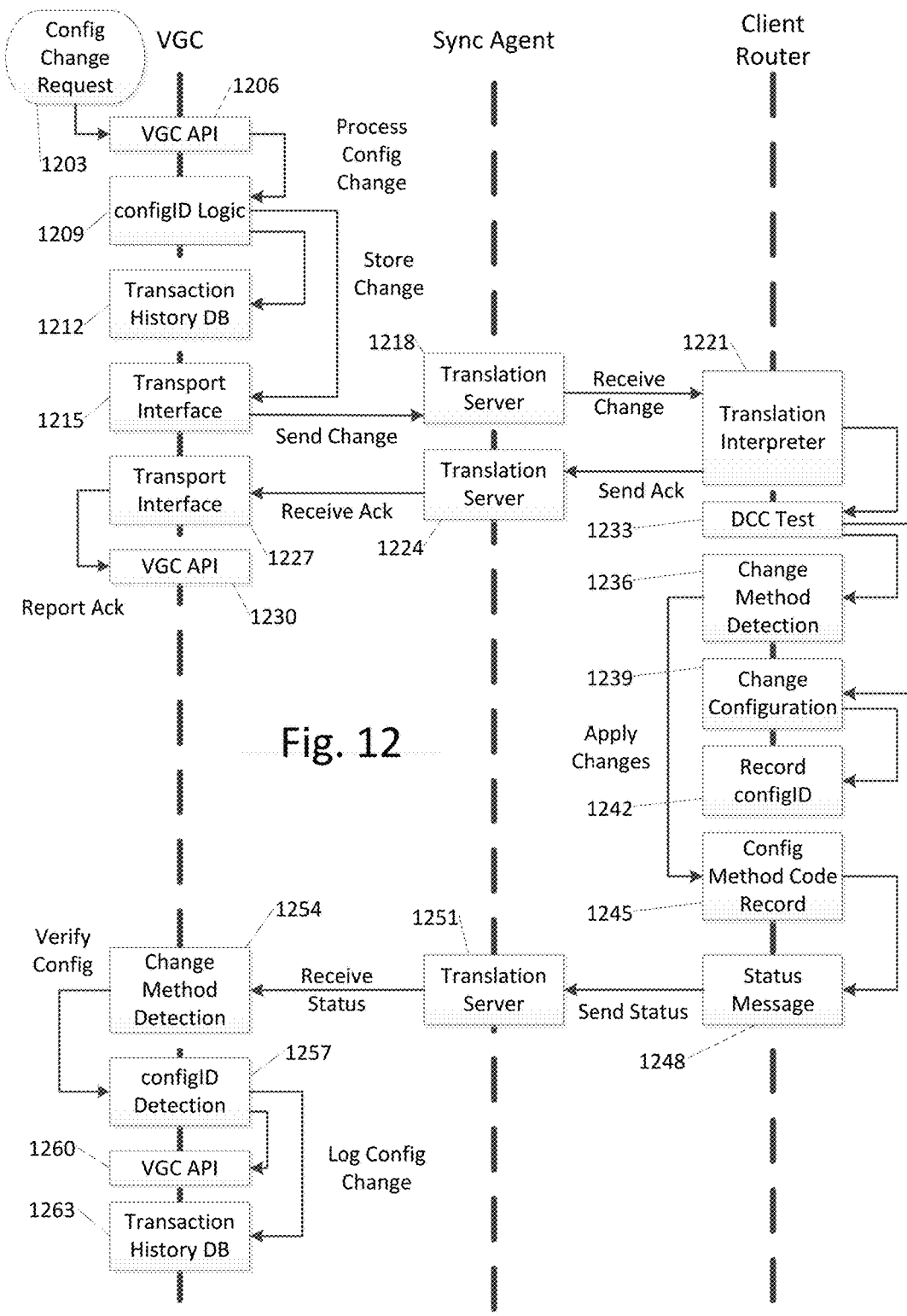
FIG. 12 depicts an example system for synchronizing messages.

FIG. 12 depicts an illustrative system for synchronizing messages between the VGC 300 and the client router 306. In some instances, the system may be referred to as a synchronization engine. The VGC 300 may manage, track, and/or update configuration changes that occur on the client router 306 via the sync engine depicted in FIG. 12. The sync agent may be an intermediary between the VGC 300 and the client router 306. For example, the sync engine may comprise telescope APIs 321, an ACS 324, and/or a protocol agent 320.

At step 1203, a configuration change may be requested. The request may ask the VGC 300 to make one or more changes to configuration settings associated with a client router 306. For example, a user accessing end-user UIs 369 may request to change the name of an SSID for a wireless connection associated with the client router 306.

At step 1206, one or more VGC APIs may receive the configuration change request. For example, the NRAS 372 may receive the configuration change request from the end-user UIs 369.

At step 1209, the VGC 300 may process a configuration ID ("configID") for the requested change. The VGC 300 may store an indicator for the current version of configuration settings associated with the client router 306. For example, if the configuration is the eighth configuration set to the client router 306, the configID may be set as "8" for a device.

At step 1212, the device may store the configID in a transaction history database. This database may store configuration changes and/or configIDs associated with each set of changes. For example, the database may store that the seventh configuration change corresponds to configID "7" and set an SSID name on the device to "ourhotspot," while the eight configuration change corresponds to configID "8" and set the password to "1234."

At step 1215, the configuration changes may be communicated to the transport interface. The communicated information may comprise changes to the client router 306 as well as identifying information associated with the change. An example of communication information may comprise a configID of "8," a password change to "1234," and an SSID name change to "ourhotspot."

At step 1218, the configuration change may be sent via the translation server. The translation server may be software operating on a sync agent, such as a protocol agent 320. The translation server may translate the message sent in step 1215 by the transport interface into a form supported by the translation server of the client router 306. For example, a TR181 message from the VGC300 may be converted into an SNMP message.

At step 1221, a translation interpreter may receive the configuration change request. The translation interpreter may be software running on the client router 306 which receives the configuration changes and configID from the translation server and determines what settings to change on the client router 306 based on the received information. The translation server may send an acknowledgement to the translation server that it has received the communicated information before proceeding to perform a data consistency check test in step 1233.

At step 1224, the translation server may receive the acknowledgement from the translation interpreter running on the client router 306. The translation server may translate the acknowledgement into a form understood by the VGC 300. For example, the translation server may translate a TR-069 acknowledgement into a TR181 acknowledgement.

At step 1227, the transport interface of the VGC 300 may receive the acknowledgement from the translation server running on the sync agent. The transport interface may then forward the acknowledgement to the VGC API.

At step 1230, the VGC API may report the acknowledgement. In some instances, an API may request confirmation that a change request has been sent and received. For example, an end-user UI may display confirmation that a change request made in step 1403 has been sent to and received by the client router 306.

At step 1233, the client router 306 may perform a data consistency check ("DCC") test. The DCC test may confirm that the VGC 300 is currently up-to-date regarding any configuration changes made on the client router 306. For example, an encryption setting may have been changed on a web-UI of the client router 306. The VGC 300 may be unaware of the encryption setting change. If an SSID change is requested by the VGC 300, but the new SSID would be incompatible with the unreported encryption setting change, unwanted behavior may result. Thus, it may be advantageous to ensure that the VGC 300 is aware of any configuration changes made to the client router 306. Further discussion of the DCC may be found in FIG. 13.

At step 1236, the client router 306 may perform change method detection. In some instances, a change method code may be utilized to identify how the change was made. The change method code may indicate if the change was set by the VGC 300, and/or by one or more other means (such as a separate SSH connection to the client router 306). For example, if the change originated from the VGC 300, then a configuration method code may be set to "512," while a change method code of "134" may indicate a change set by an SSH connection separate from the VGC 300. After determining the configuration method code, the code may be stored in step 1245.

At step 1239, the client router 306 may change one or more configuration settings consistent with instructions received from the VGC 300 or another source. For example, the client router 306 may set the SSID to "ourhotspot" consistent to instructions from the VGC 300. In another example, the client router 306 may set a wireless encryption to "AES" consistent to instructions from a separate SSH connection.

At step 1242, the client router 306 may record the configID. For example, if the configID received in a message from the VGC 300 is "8," the client router 306 may record that the current configID for the client router is "8." In another example, if the current configID of the client router 306 is "8," and a configuration change is made by a separate SSH connection, then a configID may be set to "9."

At step 1245, the client router 306 may store the configuration method code. For example, if the configuration was received from the VGC 300, the client router 306 may store the code "512" as the configuration method code for the device.

At step 1248, the client router 306 may send a status message for the changes made to the device. The status message may indicate the configuration method code, the configID, changes requested, and/or if the changes were successful. For example, if the VGC 300 had requested a name change for an SSID associated with the client router 306, the client router 306 may send a status message indicating that the configuration method code is "512," that the configID is "8," that the SSID name was changed to "ourhotspot," and that the changes were successful. The status message may also appraise the VGC 300 of any changes made separate of the VGC 300. This may have the advantage of allowing the VGC 300 to store the most recent configuration of the client router 306. For example, if the VGC 300 received a configuration change from an SNMP connection separate from the VGC 300, the status message may indicate that the configuration method code is "38," that the configID is "9," that the wireless encryption is now "AES," and that the changes were successful.

In some instances, an event on the client router 306 may trigger a status message to be sent at step 1248. Software and/or hardware on the client router 306, such as the translation interpreter, may monitor the client router 306 for any software and/or hardware events (e.g., a device reboot, a device reset, a configuration change, a detected error, or any other such event). If such an event occurs, the client router 306 may trigger a status message as discussed in step 1248, and may include the detected event. For example, the client router 306 may send a status message indicating that the configuration method code is "512," that the configID is "8," that the SSID name was changed to "ourhotspot," and that a "recorder hard drive failure" message was detected. Accordingly, in some instances, a software and/or hardware event may initiate an instance of the method depicted in FIG. 12, beginning at step 1248.

At step 1251, the translation server may receive the status message from the client router 306. The translation server may translate the acknowledgement into a form understood by the VGC 300. For example, the translation server may translate a TR-069 acknowledgement into a TR181 acknowledgement.

At step 1254, the VGC 300 may receive the status message from the translation server running on the sync agent and detect the change method code. The change method code may indicate whether the status message indicates a configuration set by the VGC 300, by a separate device, or that details are unknown. For example, the change method code may indicate that the settings were previously sent by the VGC 300, such as by code "512." In another example, the change method code may indicate that the settings were set by a web UI on the client router 306, such as by code "45." In yet another example, the message may indicate that the settings were sent by an unknown source, such as code "0." After determining the change method code, the VGC 300 may determine the configID in step 1257.

At step 1257, the VGC 300 may detect the configID in the message received from the translation server running on the sync agent. The VGC 300 may store a configID for each known configuration. This may be used by the VGC 300 to confirm that settings have been changed or to detect that changes have been made by an outside source. For example, the VGC 300 may store that the last known configuration was an SSID name change requested by the VGC 300, with configID "8." If the VGC 300 receives a status message indicating that the client router 306 has changed the SSID to "ourhotspot" with a configID of "8," the VGC 300 may determine that the requested settings were applied. If the VGC 300 receives a status message indicating that a web UI change request changed the wireless encryption to "AES," with a configID of "9," the VGC 300 may determine that an additional change has been performed externally. After detecting the configID, the VGC 300 may inform the VGC API at step 1260 and log the configuration change in a transaction history database in step 1263.

At step 1260, the VGC 300 may inform the VGC API of the configuration changes indicated in the status message. The VGC API may pass the information along to another source, such as an end-user UI. For example, the VGC API may inform the end-user UI via the NRAS 372 that the client router 306 has changed the SSID to "ourhotspot," which may cause an information message to be displayed on the end-user UI.

At step 1263, the VGC 300 may log the configuration change in a transaction history database. The VGC 300 may store configuration information for client routers 306 in a transaction history database, such as a state database 348. The log may indicate what settings were made, may indicate how the changes were requested (which may be based on the change method code), and/or may be organized chronologically (which may be based on the configID). For example, the log may indicate that the SSID name was changed by the VGC 300 to "ourhotspot," and the wireless encryption was later changed to "AES" by a web UI on the client router 306. This may provide a chronological listing of every setting applied to the device. This may have the advantage of assisting in troubleshooting the client router 306, as a technician and/or user may be able to identify what changes were made to a device, by whom the changes were made, and/or when the changes were made. For example, a user may have recently had issues connecting an older device to the client router 306. By consulting the log on the transaction history database, a technician may determine that the web UI changing the wireless encryption to "AES" made the laptop incompatible. The technician may then change the wireless encryption setting to a different setting that would be compatible (which may use a new config change request at step 1403).

Figure 13:
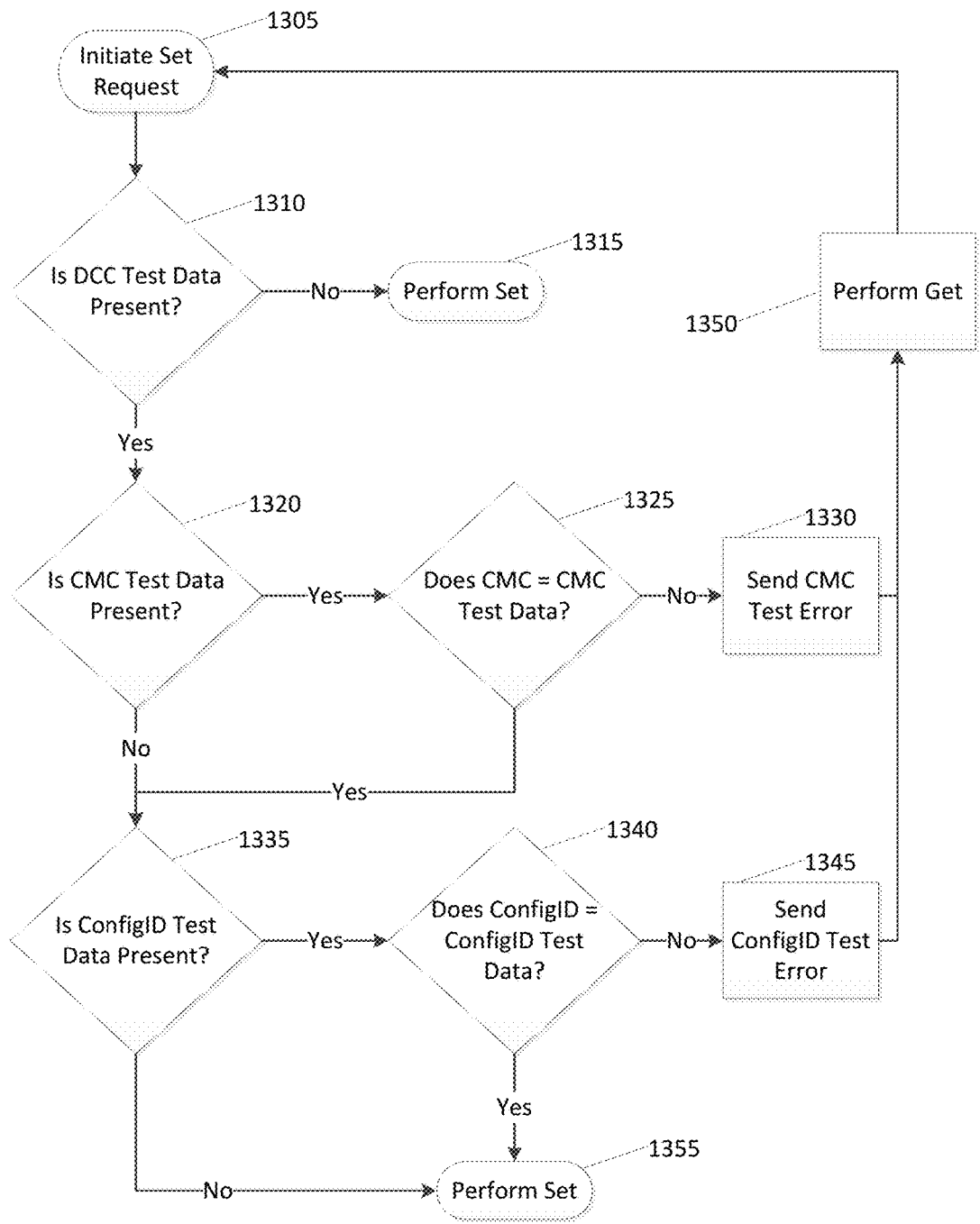
FIG. 13 depicts an example method for performing a data consistency check.

FIG. 13 depicts an illustrative method for performing a data consistency check (DCC). A client router 306 may communicate with the VGC 300 via a protocol agent 320. As discussed herein, the VGC 300 may communicate settings for the client router 306 via the protocol agent 320. In some instances, settings from other sources may be stored on the client router 306 without being uploaded to the VGC 300. For example, while the VGC 300 is attempting to set configuration settings on the client router 306, the client router 306 may receive configuration settings from another source (such as SNMP, SSH, a local web interface, command line interface, etc.). By checking that the data known to the VGC 300 is consistent with the data actually stored on the client router 306, the system may avoid overwriting settings or storing incompatible settings on the client router 306.

At 1305, the system may initiate a set request. A set request may be a request for a device, such as a client router 306, to configure one or more settings on the device. For example, the VGC 300 may receive a request to change client settings from an end-user UI 369. In accordance to one or more methods described herein (such as using the sync engine described in FIG. 12), the VGC 300 may request a configuration setting change on a client router 306.

In some instances, the set request may comprise DCC test data. DCC test data may comprise data that indicates a status associated with a previous configuration. This may be used by the device to determine if the previous configuration known by the originator of the set request matches a configuration on the device. For example, DCC test data may comprise a change method code (CMC) and a configID. The device may compare the change method code and/or configID to determine if they match a change method code and configID associated with the most recent previous changes made to the device. DCC test data that does not match the most recent configuration data stored by the device may indicate a synchronization problem. For example, the device may change configuration settings based on instructions from a web UI on the device. These settings may not be reported to a later requesting device, and the later requesting device may attempt to make changes in ignorance of the current settings of the device. By detecting the synchronization problem, the device may prevent incompatible settings being used and/or recent settings from being overridden.

At step 1310, the device may determine if the set request contains DCC test data. If no DCC test data is provided by a requesting device, then the method may conclude by changing the configuration settings in step 1315 without examining DCC test data. If DCC test data were provided with the set request, then the device may proceed to examine change method code data in step 1320.

At step 1315, the device may perform a set operation. The device may examine the set request to determine any changes to configuration settings requested in the set request. For example, the set request may comprise no DCC test data, a configID of "9," a change method code of "512," and a request to change an SSID name to "ourhotspot." The device may then store the most recent configID as "9," the most recent change method code as "512," and change the SSID name to "ourhotspot." Note that the DCC test data, which may comprise a configID and a change method code corresponding to the last known configuration, may differ from a new configID and/or change method code of the set request corresponding to the later configuration changes requested by the set request.

At step 1320, the device may determine if change method code test data is present. Change method code test data may comprise a change method code that the requesting device expects to be associated with the most recent change to the device. For example, the requesting device may expect that the most recent change was made via the VGC 300 with a change method code of "512," so the change method code test data may be a change method code of "512." If no change method code test data is present, the device may proceed to determine if configID test is present at step 1335. If change method code test data is present, the device may proceed to step 1325 to determine if the change method code test data matches the most recent change method code stored by the device.

At step 1325, the device may determine if the change method code test data matches the most recent change method code stored by the device. If the change method code test data does not match the stored change method code, it may indicate that the requesting device is unaware of recent changes and a synchronization error has occurred. For example, if the requesting device sent change method code test data comprising "512," but the most recent change method code stored by the device was "38," then the device may determine that the change method code does not match and a synchronization error may have occurred. If the data does not match, the device may proceed to sending a change method code test error at step 1330. If the data does match, then the device may proceed to determining if configID test data is present at step 1335.

At step 1330, the device may send a change method code test error. The error may indicate that the change method code test data did not match the most recent change method code data stored by the device, and may comprise the most recent configuration data. For example, the change method code test error may indicate that the test data of "512" did not match the stored value of "38," that the configID of the device is "9," and that the last change was to the SSID name. After sending the error, the device may perform a get operation at step 1350.

At step 1335, the device may determine if configID test data is present. ConfigID test data may comprise a configID that the requesting device expects to be associated with the most recent change to the device. For example, the requesting device may expect that the most recent change was made via the VGC 300 with a change method code of "8," so the configID test data may be a change method code of "8." If no configID test data is present, the device may proceed to performing a set operation at step 1335. If configID test data is present, the device may proceed to step 1325 to determine if the configID test data matches the most recent configID stored by the device.

At step 1340, the device may determine if the configID test data matches the most recent configID stored by the device. If the configID test data does not match the stored change method code, it may indicate that the requesting device is unaware of recent changes and a synchronization error has occurred. For example, if the requesting device sent a configID comprising "8," but the most recent configID stored by the device was "9," then the device may determine that the configID does not match and a synchronization error may have occurred. In some instances, the configID may iteratively count up for every change, so a mismatch may indicate how many changes were unknown to the requesting device. For example, if the requesting device sends a configID test data of "8," and the device has a configID of "10," the mismatch may indicate that two changes have been made that were unreported and/or the requesting device is unaware of. If the data does not match, the device may proceed to sending a configID test error at step 1345. If the data does match, then the device may proceed to performing a set operation at step 1355.

At step 1345, the device may send a configID test error. The error may indicate that the configID test data did not match the most recent configID data stored by the device, and may comprise the most recent configID. For example, the configID test error may indicate that the test data of "8" did not match the stored value of "9," that the change method code of the device is "38," and that the last change was to the SSID name. After sending the error, the device may perform a get operation at step 1350.

At step 1350, the device may perform a get operation. If a synchronization error was detected, the device may attempt to inform the requesting device of the configuration settings stored on the device. In some instances, the process of the device transmitting configuration information to another device may be referred to as a "get operation." For example, if the device has a configID of "9," but a requesting device expected a configID of "8," the device may initiate a get operation that sends a message informing the requesting device of the configuration settings currently applied to and/or stored on the device. After sending the requesting device the information, the device may receive a request for a new set operation at step 1305.

In some instances, the requesting device may take action based on the information obtained in the get operation. The requesting device may inform a user of the synchronization error, and/or determine how to handle the error. For example, a VGC 300 that is informed of a test data mismatch on a client router 306 may provide information to the user via an end-user UI 369 that informs the user that there was a data mismatch. The requesting device may then request that the user determine whether to accept the settings currently stored on the device or override the settings with other settings. For example, a user accessing the VGC 300 through an end-user UI 369 who was informed that an SSID name change request resulted in a DCC test failure may command the VGC 300 to use the settings previously stored on a client router 306, but to send a new set request so as to change the SSID name change. In another example, the user may command the VGC 300 to override the most recent changes in the client router 306 with settings stored in the VGC 300. In some instances, this determination may be automatic. For instance, if a requesting device receives a data mismatch error, it may reset the device to the most recent settings known to the requesting device. Alternatively, the requesting device may update its stored settings to match the device.

At step 1355, the device may perform a set operation. The device may examine the set request to determine any changes to configuration settings requested in the set request. For example, the set request may comprise a change method code test data of "512," a configID test data of "8," a configID of "9," a change method code of "512," and a request to change an SSID name to "ourhotspot." The device may then store the most recent configID as "9," the most recent change method code as "512," and change the SSID name to "ourhotspot."

Figure 14:
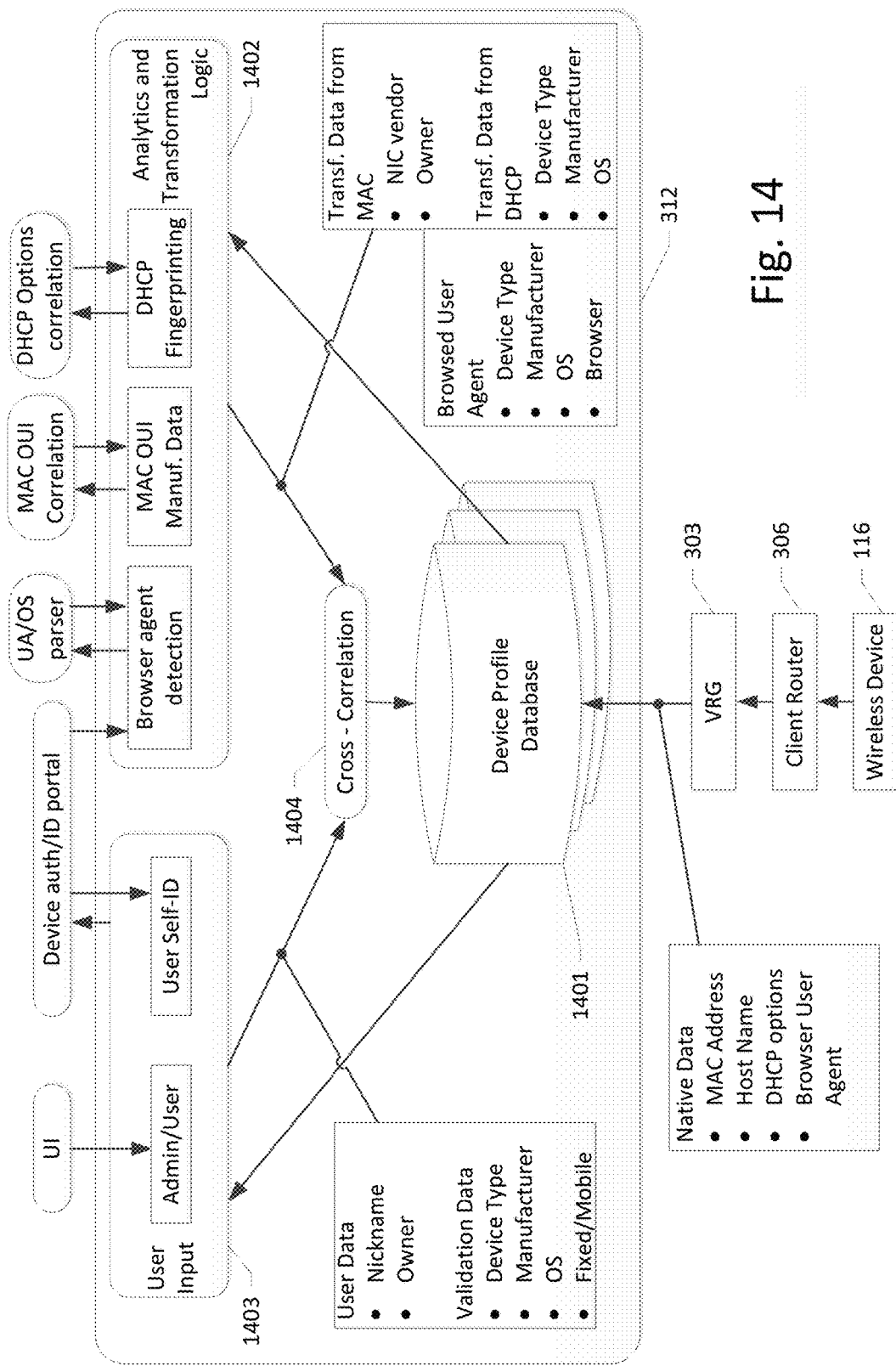
FIG. 14 depicts an example system for identifying and/or tracking devices.

FIG. 14 depicts an illustrative system for identifying and/or tracking devices. The system may correspond to the Device Fingerprinting 606 and Data Correlation & Normalization 612 aspects of the Connected Devices ID & Aggregation Engine (CDIAE) 312 of FIG. 6. The CDIAE 312 may utilize a Device Profile Database 1401, an Analytic and Transformation Logic 1402, and/or a User Input 1403 to perform the device identification, tracking, and/or visibility functions of the Device Fingerprinting 606 and the Data Correlation & Normalization 612 modules.

As shown by FIG. 14, the CDIAE 312 may use information about devices to identify those devices over time. Device identification may be used for device tracking and/or other device visibility purposes. The CDIAE 312 may utilize the Device Profile Database 1401, the Analytic and Transformation Logic 1402, and/or the User Input 1403 to identify simple information, such as a MAC addresses, or it may identify more advanced information, such as the type of device/and or its location. The CDIAE 312 may utilize information including the data path, user interactions, and/or external device mapping databases to create a historical comparison model. The CDIAE 312 may then identify intrinsic characteristics of connected devices and/or their operating systems. In some instances, the CDIAE 312 may determine if a device is static, such as a printer or set top box, or mobile, such as a smartphone or tablet. The accuracy of the CDIAE 312 may increase over time as more information is gathered. Further, a user may interact with the CDIAE 312 via the User Input 1403. For example, an end-user UI 369 may identify devices connected to a virtual router 330. A user may then be able to set information about connected devices in the end-user UI 369. This may assist the device fingerprinting module 606 in obtaining more accurate information.

In some instances, a user of a wireless device 116 may connect to a wireless network. The wireless network may utilize any wireless networking standard, such as an 802.xx standard, cellular communication network standard (e.g., 3GPP, LTE, etc.), and/or any other wireless networking standard. For example, a user may enter a premises and attempt to connect to the wireless LAN (e.g. Wi-Fi) of the premises. In another example, a user may connect to an access point established by a service provider in a public area to be a wireless hotspot for customers of the service provider. In yet another example, a user may connect to a cellular access point with a phone. When a wireless device 116 connects to a wireless network, a Dynamic Host Configuration Protocol (DHCP) request message may be sent from the wireless device 116 through the client router 306 and to the VRG 303. To analyze the information, the CDIAE 312 may utilize Analytics and Transformation Logic 1402, which may comprise one or more analysis modules. In one instance, the Analytics and Transformation Logic 1402 may comprise one or more Browser Agent Detection modules and/or User Agent Detection modules to analyze the user agent information within a message. For example, a browser user agent and/or user agent may contain data revealing the type of device (e.g. type of smart phone), device operating system, version information, type of browser (e.g. Safari, Mozilla Firefox, etc.), Session Initiation Protocol (SIP) data, software vendor, software revisions, URLs, email addresses, and/or other types of protocol, identification, and/or object code information. The Browser User Agent Detection module may be configured (e.g. using a UA/OS parser and/or a Device Authorization/Identification Portal) to identify and/or extract this information. This extracted user agent information may be utilized to determine and/or calculate a probability of identification of the wireless device 116. The identification may include a probability that the wireless device 116 is a specific type and/or model of multimedia device (e.g. Smart Phone Brand X) and/or a probability that the wireless device 116 is a device used by a specific person, agent, and/or group of users. Information in the Device Profile Database 1401 may also be used to improve the probability of identification.

In some instances, the Browser Agent Detection may detect a device based on browser information. For example, the Browser Agent Detection may determine that a Safari browser instance with certain characteristics has a 60 percent probability of being associated with a particular type of mobile device (e.g. Smart Phone Brand X). Additional pieces of information may either increase or decrease this probability. For example, if a device operating system A is used in conjunction with Safari, then this combination may increase the probability to 70 percent that the wireless device 116 is a particular type of mobile device. Also, correlation of this data with information from the Device Profile Database 1401 may increase or decrease the probability.

In some instances, the Analytics and Transformation Logic 1402 may comprise one or more Media Access Control (MAC)—Organizationally Unique Identifier (OUI) Manufacturer Data analysis modules. This module may be configured to extract unique MAC address information for the wireless device 116, such as a 48-bit identifier and/or a 12 hexadecimal character formatted in any number of various configurations. This module may also be configured to extract a unique OUI (e.g. NIC vendor) that identifies vendor and/or manufacturer information for the wireless device 116, such as a 24-bit identifier assigned by a standard configuration control organization. This extracted MAC OUI information may be used to identify a plurality of information, such as owner information for the wireless device 116 and/or NIC vendor information. This module may extract this information by way of a MAC OUI correlation function that uses the extracted MAC OUI information to correlate and/or compare the information with other databases, such as the Device Profile Database 1401. The extracted and/or identified MAC OUI information may be utilized to determine and/or calculate a probability of the wireless device 116 corresponding to a particular identification. The MAC OUI probability calculations may be combined and/or correlated with the extracted user agent probability information (from the Browser Agent Detection module) to improve the probability of identifying the wireless device 116. In addition, or in the alternative, the MAC OUI information may be combined and/or correlated with the Browser Agent Detection information in order to calculate the probability of identifying the wireless device 116.

In some instances, the Analytics and Transformation Logic 1402 may comprise one or more DHCP Fingerprinting analysis modules that may interoperate with one or more DHCP Options Correlation modules in order to analyze the DHCP request message. This module may be configured to extract data from the DHCP message, such as IP address information, device type, manufacturer, and/or operating system information. This information may be used to determine and/or calculate a probability of identification of the wireless device 116. This information and/or probability may be combined and/or correlated with the extracted information and/or probabilities from other modules of the Analytics and Transformation Logic 1402 to improve the accuracy of identifying the wireless device 116. Also, correlation of this data with information from the Device Profile Database 1401 may increase or decrease the probability.

In some instances, consistent with the systems and/or methods discussed herein, a user may interact with the CDIAE 312 via User Input 1403. For example, an end-user UI 369 may receive a notification (e.g. via the Admin/User module and/or the User Self-ID module of User Input 1403) from the system that a new device has been connected to a virtual router 330. The notification may contain a request to identify data regarding the device, such as a nickname, owner, device type, manufacturer, operating system information, whether the device is mobile, and/or other identifying information. In addition, or in the alternative, the system may send a request to the user to validate the same information. A user may then be able to set and/or validate information about connected devices in the end-user UI 369.

The information from the User Input 1403 and/or the Analytics and Transformation Logic 1402 may be correlated and/or compared with each other at a Cross-Correlation module 1404. In some instances, the information from the User Input 1403 may be used to improve the probability of identification of a wireless device 116 as computed by the Analytics and Transformation Logic 1402. In other instances, the information from the User Input 1403 may be used to resolve conflicts between information from different modules of the Analytics and Transformation Logic 1402. For example, DHCP Fingerprinting may have extracted information indicating that the wireless device 116 is of device type A, while the Browser User Agent may have extracted information that the wireless device 116 is of device type B. By way of the User Input 1403, the user may have identified the wireless device 116 as being device type A. The system may be configured to simply determine with one hundred percent probability that the wireless device 116 is of device type A based on the user input correlating with the DHCP Fingerprinting. In the alternative, the system may be configured to simply add the user input information regarding device type into the aggregate in order to recalculate the probability of identifying the wireless device 116.

The Cross-Correlation module 1404 may be configured to validate individual pieces of identifying information if all of the various information sources are aligned, e.g. if all of the modules (including User Input 1403) identify the wireless device 116 as being of type A. In cases of conflict between modules (including the User Input 1403), certain modules may be configured to take priority over other modules. For example, information from the User Input 1403 may be relied on over other sources. In the alternative, if a conflict arises, then a message may be sent to the user requesting further verification. The results of the verification may be determinative to identification of specific pieces of information. In other instances, probabilities may be determined based on all available information regarding the accuracy of individual pieces of information and/or the overall identification of the wireless device 116.

As an illustrative example, each module may be assigned an equal probability score. If the Browser Agent Detection module determines that the wireless device 116 is of device type D, then that determination may be given a probability score of 25 percent. If the MAC OUI Manufacturer Data module determines that the wireless device 116 is of device type D, then that determination may be given a probability score of 25 percent. If the DHCP Fingerprinting module determines that the wireless device 116 is of device type F, then that determination may be given a probability score of 25 percent. Finally, if the User Input 1403 indicates that the wireless device 116 is of device type D, then that determination may be given a probability score of 25 percent. In accordance with this example, there may be a 75 percent probability that the wireless device 116 is of device type D, and a 25 percent probability that the wireless device 116 is of device type F. The Cross-Correlation module 1404 may have one or more rules, which have been pre-set (by users, administrators, and/or the system itself) to resolve conflicts. For example, a rule may be set stating that the greater probability will prevail. Under such a rule, the system would determine that the wireless device 116 is of device type D. Then, the system may access a Device Profile Database 120 to determine whether a policy is associated with the user and device type D. The system may then apply the policy. In another example, a rule may state that some devices are given more weight than others. Device type D may be a model that is only owned by a few thousand consumers, while device type F may be owned by several million customers. The system may thus require that the probability that the wireless device 116 is of device type D to be at least 90 percent, or the device is labeled as device type F.

In another instance, a rule may give greater weight to any user input. For example, any determinations of the Browser Agent Detection module may be assigned a probability score of 16.7 percent. Any determinations of the MAC OUI module may be assigned a probability score of 16.7 percent, and any determinations of the DHCP Fingerprinting module may be assigned a probability score of 16.7 percent. Any determinations based on the User Input 1403 may be assigned a probability score of 50 percent, which may represent the greater weight for user input. In this example, if the User Input 1403 indicates that the device type of the wireless device 116 is type G, but the other three modules determine that the device type of the wireless device 116 is type H, then the probability score may be tied at 50 percent to 50 percent. In such a case, the Cross-Correlation module 1404 may have an additional rule that states that in the event of a tied probability score, a message may be sent to the user and/or administrator to re-verify the information. Then, the result of the re-verification may be determinative.

If a wireless device 116 has been identified with an associated probability, then the wireless device 116 may be tracked and/or visibility may be maintained. Unique identifying information (e.g. MAC address) may be tagged to the wireless device 116 for ease of tracking and/or visibility. All of the information determined and/or extracted in the CDIAE 312 may be stored in the Device Profile Database 1401. Even though the various components of the CDIAE 312 may be shown in FIG. 12 as parts of distinct modules, some and/or all of the modules may be intermingled and/or grouped with others components in any other logical arrangement. FIG. 14 simply depicts one exemplary configuration.

Figure 15:
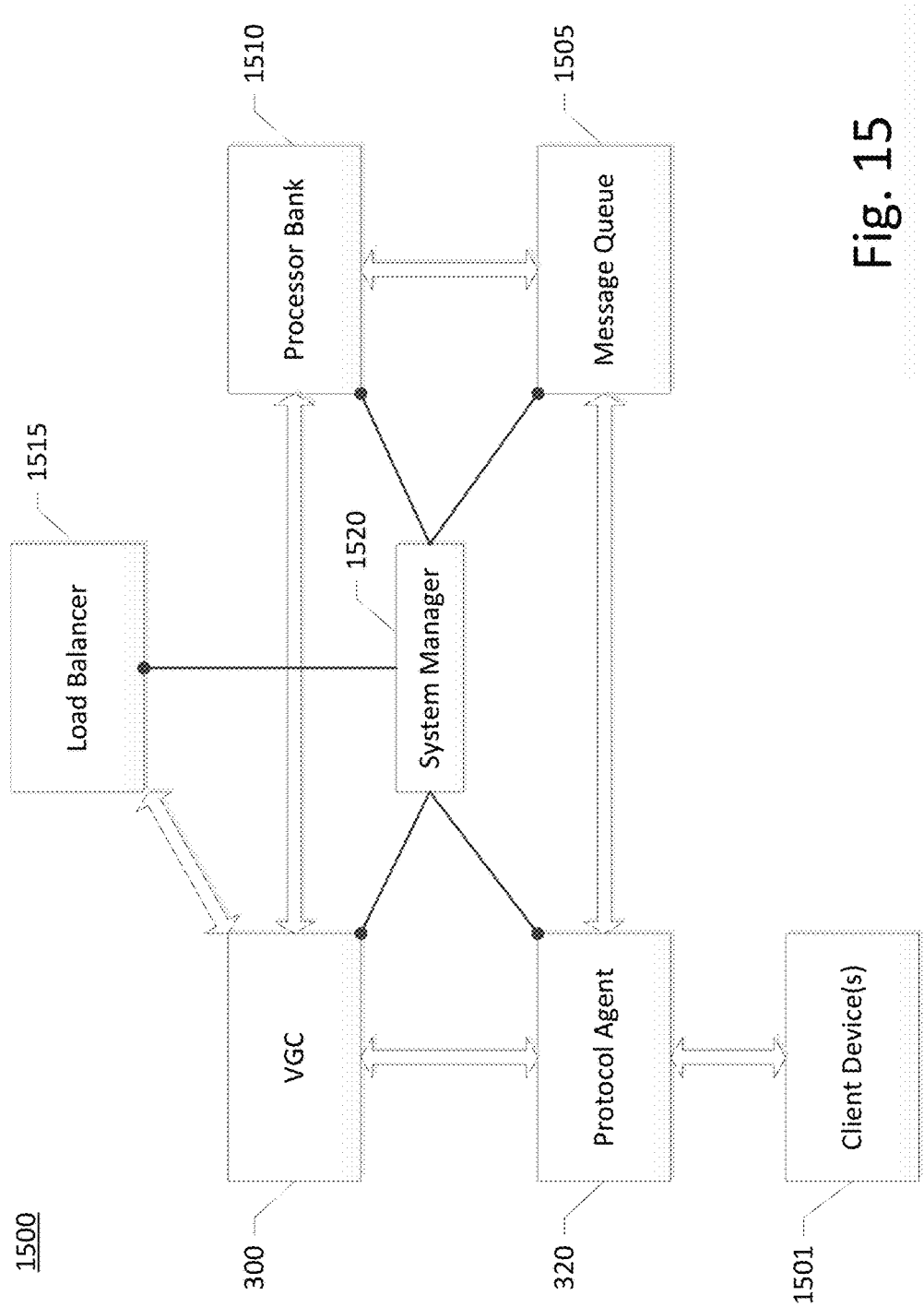
FIG. 15 depicts an example system for managing message flow within a virtual gateway control and management system.

FIG. 15 depicts an illustrative system for managing message flow within a virtual gateway control and management system 1500. Within a system 1500, a system manager 1520 may orchestrate and/or control the operation of all system components in order to allocate resources and/or control message flow within and/or out of the system 1500. The system 300 may comprise a protocol agent 320 that may serve as a protocol translation module and/or conversion device configured to convert the network protocols internal to the system 1500 into a plurality of other protocols utilized by client devices 1501 (such as client routers 306) and vice versa. For example if a client device 1501 sends a message (using SNMP protocol) to system 1500, then the protocol agent 320 may determine that the message is formatted according to SNMP protocol and may convert the message into a protocol used by system 1500. After protocol conversion, the protocol agent 320 may send the message to the VGC 300. As another example, the system 1500 may send a message and/or request (e.g. a configuration change request) to the protocol agent 320 using a format different from the format used by the client device 1501. As a result, the protocol agent 320 may identify the format of the client device 1501 and then convert the message into the format compatible with the client device 1501.

In some instances, such as for status messages, the protocol agent 320 may send reformatted messages received from the client device 1501 to the message queue 1505, which may send the message to a processor bank 1510. In a large architecture, a device may, at times, receive more messages than it may be able to process. For example, the processor bank 1510 may have the capacity to handle 100 messages a second (for example, an input to the processor bank 1510 may have a bandwidth restriction that may cause it to discard messages received beyond a certain rate). Because messages may be asynchronous, there may be periods of time where transmissions in a second greatly exceed the capacity (for example, though an average rate may be 50 messages a second, bursts of messages may occasionally exceed 100 messages a second). The message queue may receive the messages from one or more devices, queue the messages, and then transmit the messages to an intended recipient according to the capabilities of the recipient. For example, the message queue 1505 may buffer 250 messages, and then transmit messages from the buffer to the processor bank 1510 at a rate of 100 messages a second. This may have the advantage of preventing the processor bank 1510 from being overwhelmed while maximizing the number of processed messages (and reducing the instances of lost and/or discarded messages). In some instances, the message queue 1505 may be implemented as a KAFKA message queue.

The processor bank 1510 may process messages from the message queue 1505 and/or send information to the VGC 300 to advise the VGC 300 of any changes in the VGC 300, the client devices 1501, and/or the client routers 306. These changes may include state changes, software updates, and/or other such changes. In some instances, the system 1500 may comprise a plurality of VGC 300s.

A load balancer 1515 may be used to manage one or more downstream systems. The load balancer 1515 may determine which downstream servers (e.g., VGC 300s) are on-line and which downstream servers have been taken off-line. In some instances, if a downstream server goes off-line, the load balancer may bring another server on-line to compensate and/or replace the off-line server. This may have the advantage of reducing downtime, which may improve the user experience. The load balancer 1515 may also distribute processing responsibilities amongst the downstream servers to ensure efficient use of processing power to achieve optimal efficiency and/or processing speed. The load balancer 1515 may assign one or more client devices 1501, client servers 306, and/or component of systems 1500 to a downstream server in order to perform necessary processing. In addition, the load balancer 1501 may ensure redundancy for all system processing. This may have the advantage of reducing interruptions to processing for system 1500 in the event of a component failure.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed is:

1. A method comprising:
receiving, by a computing device and from a gateway device associated with a user profile, a configuration data message in a first configuration protocol associated with the gateway device;
determining, by the computing device, a management server configured to manage at least one configuration setting for the gateway device;
establishing, by the computing device, a virtual connection for communication between the gateway device and the management server;
generating, by the computing device and based on the configuration data message, a configuration update message in a second configuration protocol associated with the management server; and
sending, by the computing device, to the management server, and via the virtual connection, the configuration update message, wherein the configuration update message is configured to cause the management server to update the at least one configuration setting.

2. The method of claim 1, further comprising:
determining at least one other gateway device associated with the user profile;
causing sending, via the management server and to the at least one other gateway device, of the at least one configuration setting; and
causing configuration of the at least one other gateway device based on the at least one configuration setting.

3. The method of claim 1, wherein the configuration data message comprises a status update corresponding to the gateway device, and wherein the status update comprises at least one change corresponding to the at least one configuration setting.

4. The method of claim 3, further comprising:
causing a determination, based on the at least one change, to apply an update to the at least one configuration setting; and
causing sending, via the management server and to the gateway device based on the determination to apply the update to the at least one configuration setting, of at least one replacement configuration setting for the gateway device.

5. The method of claim 3, wherein the sending the configuration update message to the management server is based on a request, from the management server, for the status update associated with the gateway device.

6. The method of claim 3, further comprising updating the gateway device based on the at least one change.

7. The method of claim 1, wherein each of a plurality of client devices is associated with at least one of a plurality of users associated with the user profile.

8. The method of claim 1, wherein the determining the management server configured to manage the at least one configuration setting for the gateway device comprises determining the management server based on:

a media access control (MAC) address associated with the gateway device, and the user profile.

9. The method of claim 1, wherein the first configuration protocol conforms to a canonical data object model, and wherein the second configuration protocol conforms to at least one or more of:
Simple Network Management Protocol, or
Secure Shell.

10. The method of claim 1, wherein the gateway device comprises at least one component of the computing device.

11. A method comprising:
receiving, by a computing device and from a gateway device, an indication, according to a first configuration protocol associated with the gateway device, of at least one change associated with the gateway device;
determining, by the computing device, a management server configured to manage at least one configuration setting for the gateway device;
establishing, by the computing device, a virtual connection for communication between the gateway device and the management server;
generating, by the computing device and based on the indication, a configuration update message formatted according to a second configuration protocol associated with the management server; and
sending, by the computing device, to the management server, and via the virtual connection, the configuration update message, wherein the configuration update message is configured to cause the management server to update the at least one configuration setting.

12. The method of claim 11, further comprising updating the gateway device, wherein the gateway device is associated with a user profile.

13. The method of claim 11, further comprising:
determining at least one other gateway device managed by the management server;
causing sending, via the management server and to the at least one other gateway device, of the at least one configuration setting; and
causing configuration of the at least one other gateway device based on the at least one configuration setting.

14. The method of claim 11, wherein the determining the management server configured to manage the at least one configuration setting for the gateway device comprises determining the management server based on a media access control (MAC) address associated with the gateway device.

15. The method of claim 11, wherein the first configuration protocol conforms to a canonical data object model, and wherein the second configuration protocol conforms to at least one or more of:
Simple Network Management Protocol, or
Secure Shell.

16. A method comprising:
receiving, by a computing device and via a first communication path, configuration information for the computing device;
receiving, by the computing device and from a gateway device, an indication, according to a first configuration protocol associated with the gateway device, of at least one change associated with the gateway device;
determining, by the computing device, a management server configured to manage at least one configuration setting for the gateway device;
establishing, by the computing device, a virtual connection for communication via a second communication path between the gateway device and the management server;
generating, by the computing device and based on the indication, a configuration update message formatted according to a second configuration protocol associated with the management server; and
sending, by the computing device and to the management server, the configuration update message, wherein the configuration update message is configured to cause the management server to update the at least one configuration setting.

17. The method of claim 16, further comprising updating the gateway device, wherein the gateway device is associated with a user account.

18. The method of claim 16, further comprising:
determining at least one other gateway device managed by the management server;
causing sending, via the management server and to the at least one other gateway device, of the at least one configuration setting; and
causing configuration of the at least one other gateway device based on the at least one configuration setting.

19. The method of claim 16, wherein the determining the management server configured to manage the at least one configuration setting for the gateway device comprises determining the management server based on a media access control (MAC) address associated with the gateway device.

20. The method of claim 16, wherein the first configuration protocol conforms to a canonical data object model, and wherein the second configuration protocol conforms to at least one or more of:
Simple Network Management Protocol, or
Secure Shell.

* * * * *

UNITED STATES PATENT AND TRADEMARK OFFICE
CERTIFICATE OF CORRECTION

PATENT NO. : 10,404,532 B2
APPLICATION NO. : 15/094404
DATED : September 3, 2019
INVENTOR(S) : Ramasubramani et al.

It is certified that error appears in the above-identified patent and that said Letters Patent is hereby corrected as shown below:

On the Title Page

Item (73), Assignee, Line 1:
Delete "Commnications," and insert --Communications,-- therefor In the Specification Column 5, Detailed Description, Line 63:
Delete "DOC SIS" and insert --DOCSIS-- therefor Column 9, Detailed Description, Line 50:
Delete "320." and insert --306.-- therefor Column 10, Detailed Description, Line 11:
After "protocol", insert --agent--

Column 17, Detailed Description, Line 10:
Delete "300," and insert --330,-- therefor Column 29, Detailed Description, Line 46:
Delete "120" and insert --1401-- therefor Column 30, Detailed Description, Line 27:
Delete "300" and insert --1500-- therefor Column 31, Detailed Description, Line 26:
Delete "servers" and insert --routers-- therefor Column 31, Detailed Description, Line 28:
Delete "1501" and insert --1515-- therefor Signed and Sealed this
Thirteenth Day of December, 2022

*Katherine Kelly Vidal*

Katherine Kelly Vidal
*Director of the United States Patent and Trademark Office*